US011992958B2

(12) United States Patent
Lozier et al.

(10) Patent No.: US 11,992,958 B2
(45) Date of Patent: May 28, 2024

(54) ADAPTIVE FIXTURING SYSTEM

(71) Applicant: Thor Tech, Inc., Elkhart, IN (US)

(72) Inventors: Todd B. Lozier, Elkhart, IN (US); Steven J. Romanowski, Albion, IN (US)

(73) Assignee: Thor Tech, Inc., Elkhart, IN (US)

( * ) Notice: Subject to any disclaimer, the term of this patent is extended or adjusted under 35 U.S.C. 154(b) by 513 days.

(21) Appl. No.: 17/190,795

(22) Filed: Mar. 3, 2021

(65) Prior Publication Data
US 2021/0276195 A1 Sep. 9, 2021

Related U.S. Application Data

(60) Provisional application No. 62/984,998, filed on Mar. 4, 2020.

(51) Int. Cl.
*B25J 9/16* (2006.01)
*B25J 15/06* (2006.01)

(52) U.S. Cl.
CPC ............ *B25J 9/1687* (2013.01); *B25J 9/163* (2013.01); *B25J 9/1682* (2013.01); *B25J 15/0608* (2013.01); *G05B 2219/40033* (2013.01); *G05B 2219/50122* (2013.01)

(58) Field of Classification Search
CPC ........ B25J 9/1687; B25J 9/163; B25J 9/1682; B25J 15/0608; G05B 2219/40033; G05B 2219/50122; B23K 37/0408
See application file for complete search history.

(56) References Cited

U.S. PATENT DOCUMENTS

| 5,220,718 | A  | * | 6/1993 | Speller, Sr. | ............ | B25J 15/103 |
|           |    |   |        |              |              | 29/430      |
| 5,247,733 | A  | * | 9/1993 | Kubota       | ................. | B23P 21/006 |
|           |    |   |        |              |              | 29/785      |
| 6,301,763 | B1 | * | 10/2001 | Pryor       | ...................... | B23P 19/10  |
|           |    |   |        |              |              | 29/702      |
| 10,507,584 | B2 | * | 12/2019 | Peters     | .................... | B25J 9/1697 |
| 10,793,047 | B1 | * | 10/2020 | Theobald   | .................. | B60P 1/54   |

(Continued)

OTHER PUBLICATIONS

US 11,724,405 B2, 08/2023, Knuepfel (withdrawn)*

*Primary Examiner* — Sohana Tanju Khayer
(74) *Attorney, Agent, or Firm* — Gardner, Linn, Burkhart & Ondersma LLP

(57) ABSTRACT

A fixturing system for processing components includes a work surface, such as a table formed from a ferromagnetic material, a tool fixture having a magnet operable for securing the tool fixture to the work surface and having at least one alignment surface to hold and/or align a component to the tool fixture and to the work surface. The system further includes a storage location spaced from the work surface for storing the tool fixture when not in use on the work surface, a work piece, and optionally a robotic arm with a controller to move the work piece and robotic arm, and a computer having stored therein component location data. The computer is configured to control the work piece to retrieve the tool fixture from the storage location and to place the tool fixture on the work surface at a tool fixture location based on the component location data for aligning, and optionally holding the two components with the tool fixture while being processed.

20 Claims, 20 Drawing Sheets

(56) References Cited

U.S. PATENT DOCUMENTS

| | | | |
|---|---|---|---|
| 2002/0161482 A1* | 10/2002 | Dugas | B25J 9/1679 |
| | | | 700/245 |
| 2005/0065647 A1* | 3/2005 | Perry | B25J 9/161 |
| | | | 700/245 |
| 2009/0044655 A1* | 2/2009 | DeLouis | B25J 17/00 |
| | | | 403/24 |
| 2009/0249606 A1* | 10/2009 | Diez | B25J 15/0608 |
| | | | 29/428 |
| 2012/0152911 A1* | 6/2012 | Diez | B23K 37/0211 |
| | | | 219/117.1 |
| 2015/0343640 A1* | 12/2015 | Shi | B25J 9/1687 |
| | | | 382/153 |
| 2017/0356167 A1* | 12/2017 | Paul | B25J 15/0491 |
| 2018/0111266 A1* | 4/2018 | Okada | B25J 9/1682 |
| 2018/0257221 A1* | 9/2018 | Toothaker | B25J 9/1612 |
| 2020/0001454 A1* | 1/2020 | Iwasa | B25J 9/023 |
| 2020/0114523 A1* | 4/2020 | Knuepfel | A47J 31/4496 |
| 2020/0242544 A1* | 7/2020 | Galluzzo | G05D 1/0088 |
| 2021/0154950 A1* | 5/2021 | Czinger | B29C 65/1448 |

\* cited by examiner

ADAPTIVE FIXTURING SYSTEM

This application claims the benefit of U.S. Prov. App. No. 62/984,998, filed Mar. 4, 2020 entitled ADAPTIVE FIXTURING SYSTEM, which is incorporated by reference herein in its entirety.

TECHNICAL FIELD AND BACKGROUND

Recreational vehicle (RVs) components, such as walls, including interior walls and sidewalls, floors, and ceilings, are typically formed from a metal frame. Forming these frames requires significant space.

A typical sidewall frame ranges from 26 feet to 46 feet in length and weighs in a range of about 170 lbs. to 210 lbs., and in some cases upward of 250 lbs. The most common method of manufacturing a welded sidewall frame, for example, in the industry is by "stack welding" on a weld table. Stack welding consists of taking a welded master frame, which can support several frames stacked on top of it, and laying it on a welding table large enough to support the master frame and the stacked frames. The frame members (e.g. cut aluminum tube pieces) to be welded are then loaded onto the master frame and either clamped to the master frame or held in place by hand to facilitate welding of the welded seams. Subsequent frame members can then be loaded onto the top frame and welded one on top of the other frame until the designated capacity of the master frame is reached. This stack welding method of manufacturing is also used for the fabrication of the frames for floors, rear walls, roofs, interior and partition walls, including accessory compartment frames, in the RV industry and in other industries.

Because these master frames are unique for each frame application, which may vary for each RV model, RV manufacturers require a large number of master frames and, hence, significant storage space to store the master frames when not in use. Further, given their weight and size, handling of the master frames can be unwieldy. Additionally, because the master frames are typically stored on their sides in a stacked, leaning arrangement, there is a tendency for the frames to bend and warp over time. Therefore, the maintenance and repair of these master frames represents an additional step and, hence, additional costs.

Accordingly, there is a need for a fixturing system that can eliminate the need to use stack welding and the associated use of master frames and, further, a system that can be used for other methods of processing the components, for example, such as joining components together, such as by gluing, riveting, molding or the like, or applying a sealant or insulation.

SUMMARY

Accordingly, a fixturing system for holding and/or aligning one or more components to be processed includes a work surface and a tool fixture. The tool fixture or the work surface has a coupler for securing the tool fixture to the work surface. Further, the tool fixture may have at least one alignment surface to align the component relative to the tool fixture on the work surface. The system further includes a storage location spaced from the work surface for storing the tool fixture when not in use on the work surface, a work piece for holding the tool fixture, and a computer that controls the work piece. The computer has stored therein component location data and is configured to control the work piece to retrieve the tool fixture from the storage location and to place the tool fixture on the work surface at a tool fixture location based on the component location data.

In one embodiment, the tool fixture also includes a retaining surface to retain the component on the work surface. For example, the tool fixture may include a clamp to form the retaining surface to apply a clamping force. In another form, the retaining surface may be formed from a flange to form the retaining surface and optionally to apply a biasing force to retain the component on the work surface. Alternately, the retaining surface may be configured to simply frictionally engage the component on the work surface or simply form a stop to prevent the component from lifting off the work surface.

In one embodiment, the component location data includes a joint location, such as a weld joint location, and the computer is configured to control the work piece to place the tool fixture on the work surface at the tool fixture location at an offset from the joint location.

In another embodiment, the computer is configured to determine the offset for the tool fixture. For example, the computer may have stored therein a defined working space on the work surface, and the fixturing system further includes a reference fixture for placement in a known location in the defined working space on the work surface. The computer may then be configured to use the reference fixture to determine the offset from the joint location for the tool fixture and to associate and store the offset with the tool fixture identification for the tool fixture.

In yet another embodiment, the tool fixture has a tool fixture body, and the computer is configured to control the work piece to engage the tool fixture body. When the tool fixture is registered with the reference fixture, the computer is configured to determine the offset based on the known location of the reference fixture and the known location of the tool fixture.

In other embodiments, the tool fixture comprises a first tool fixture, and the location data comprises first location data and second location data, and the storage location comprises a first storage location. The fixturing system further includes a second tool fixture and a second storage location, and the computer is configured to control the work piece to retrieve the second tool fixture from the second storage location and to place the second tool fixture on the work surface relative to the second location data for holding one or more components while being processed, such as when being welded.

In any of the embodiments, the tool fixture includes a carrier, with the coupler mounted to the carrier.

For example, when the coupler comprises a magnet, the magnet is mounted to the carrier. Optionally, the magnet may include an actuator to change the magnet between a deactivated state where the tool fixture can be moved from work surface to a coupling state where the tool fixture can be magnetically coupled to the work surface. Alternately, the magnet may remain an activated state, and the work piece is configured with sufficient strength to separate the tool fixture from the work surface when the fixture is to be moved.

In another embodiment, the coupler may comprise a pneumatic coupler, such as a suction cup, with the computer controlling the flow of air to and from the pneumatic coupler.

In yet another embodiment, the coupler may be provided at the work surface. For example, when provided at the work surface, the coupler may comprise a pneumatic system that generates suction at the work surface to hold a fixture on the work surface or the work surface may have a tacky surface to adhere the fixture to the work surface, but which is releasable using the work piece. In yet another form, the fixture may have the tacky surface to adhere to the work surface.

In one embodiment, the carrier may support a pair of clamps at an angle relative to each other for holding two components at an angle relative to each other while being welded.

In another embodiment, a fixturing system for holding components to be welded to form an assembly includes a work surface formed from a ferromagnetic material, a plurality of tool fixtures, each respective tool fixture of the plurality of tool fixtures having a magnet operable for securing the respective tool fixture to the work surface and at least one clamp to hold a component relative to the respective tool fixture and the work surface, and a storage location for each respective tool fixture. The storage locations are spaced from the work surface for storing the respective tool fixtures when not in use on the work surface. The system further includes a work piece and a computer. The computer has stored therein joint location data, such as weld joint location data, of each joint of the assembly to be processed, and the computer is configured to control the work piece to retrieve the respective tool fixtures from the storage locations and to place the respective tool fixtures on the work surface at tool fixture locations based on the joint location data to hold the components while being joined.

In one embodiment, the computer has stored therein a defined working space on the work surface. The fixturing system further includes a reference fixture for placement in a known location in the defined working space on the work surface. Each of the respective tool fixtures have a tool fixture identification, and the computer is configured to use the reference fixture to determine the offset from a fixture joint location (for example, offset weld joint location) of each of the respective tool fixtures and to associate the offsets with the tool fixture identification for each of the respective tool fixtures. The computer is configured to control the work piece to place the respective tool fixtures at the tool fixture locations based on the offsets and the joint location data.

For example, the computer may store the offsets in association with the tool fixture identification for each of the respective tool fixtures.

In another embodiment, the computer may be configured to periodically check the offsets of each respective tool fixture against the reference fixture to determine wear or damage to the respective tool fixture.

In another embodiment, the tool fixture may have a device to store data, such as its registration data. For example, the tool fixture may have a readable device, such as an RFID tag. In this manner, the computer may compare the registration data on the device to the located joints using the offsets of the tool fixture relative to the registration fixture to confirm that the joint is where it is expected.

In a further embodiment, when the computer determines that the joint, such as a weld joint, is not where it is expected, the computer may generate a notification that the tool fixture needs to be examined. For example, the notification may be a simple notification, such as an alert light, or a more detailed notification, such as message, including a text message, on the computer's display.

In any of the embodiments, the computer is configured to control the work piece to actuate the magnets of the respective tool fixtures between the deactivated state and their coupling state after placement of the respective tool fixtures on the work surface.

In any of the embodiments, the computer may be configured to control the work piece to retrieve the tool fixtures from the work surface after the components are processed and the magnets are deactivated.

For example, the computer may be configured to control the work piece to deactivate the magnets of the tool fixtures after the components are processed, e.g. welded or glued.

Further, the computer is configured to control the work piece to return the tool fixtures to their respective storage locations after the components are processed, e.g. welded or glued.

In other aspects, the work piece is configured to weld the components using weld joint location data.

In yet other aspects, the computer is configured to control the work piece to place the components in the working space between the tool fixtures.

In another embodiment, a method of processing, such as by joining, components in a predetermined arrangement to form an assembly includes providing a work surface and providing a plurality of tool fixtures. The method further includes defining a working space, such as a working space, on the work surface, electronically storing component location data in the working space for the components, and physically storing each of the tool fixtures in a storage location spaced from the work surface. The method additionally includes retrieving the tool fixtures from the storage locations, placing the tool fixtures on the work surface using the component location data, and after placing the tool fixtures, coupling the tool fixtures on the work surface. The components are then at least aligned, and optionally secured with the tool fixtures in their predetermined arrangement, and processed, such as by joining, including welding, gluing, molding or the like, to form the assembly.

In one embodiment, the step of placing the tool fixtures on the work surface using the component location data includes determining the fixture offset for each respective tool fixture relative to a joint location for each respective tool fixture.

In a further embodiment, the step of determining the fixture offset includes locating a reference fixture at a known reference location in the working space and registering each tool fixture with the reference fixture to thereby determine the fixture offset for each respective tool fixture.

In any of the above, each fixture offset of each respective tool fixture may be stored in association with a fixture tool fixture identification for each respective tool fixture, and the computer may periodically or be prompted to check the stored offsets of the tool fixtures against the reference fixture.

Before the various embodiments disclosed herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE FIGURES

Figure 13:
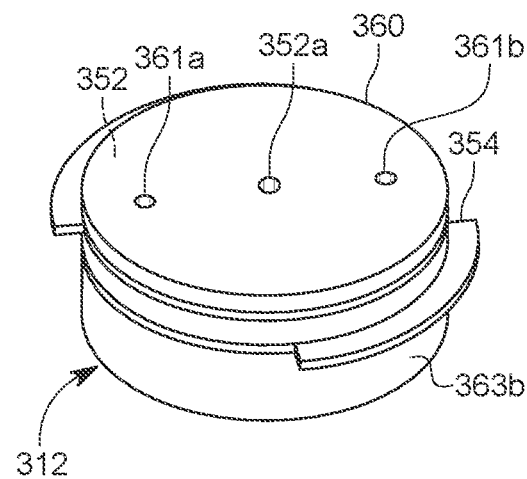
Figure 14:
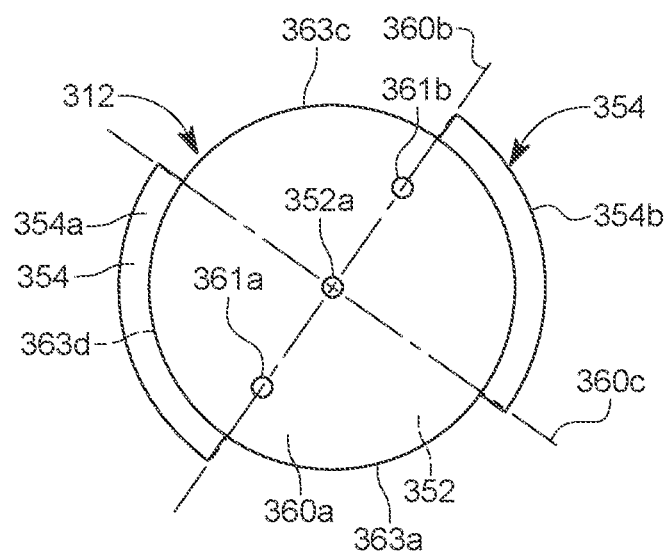

FIG. 13 a schematic elevation view of an alternate embodiment of the tool fixture that provides one or more alignment points and, optionally, one or more hold down devices;

FIG. 14 is a top plan view of the tool fixture of FIG. 13; and

Figure 15:
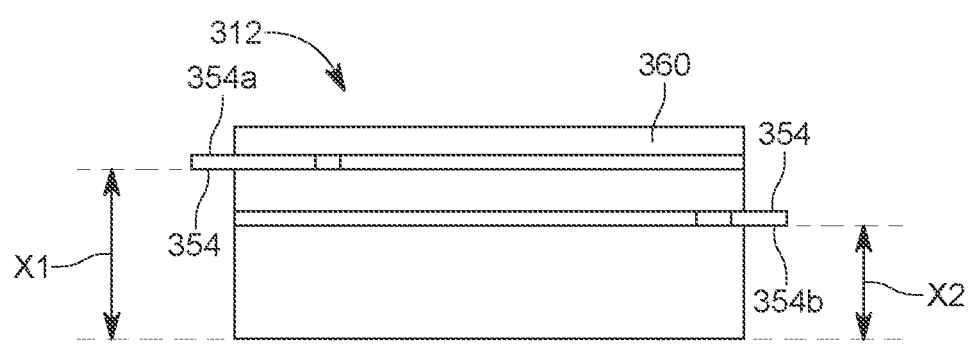

FIG. 15 is a side elevation view of the tool fixture of FIG. 13.

DETAILED DESCRIPTION

Figure 1:
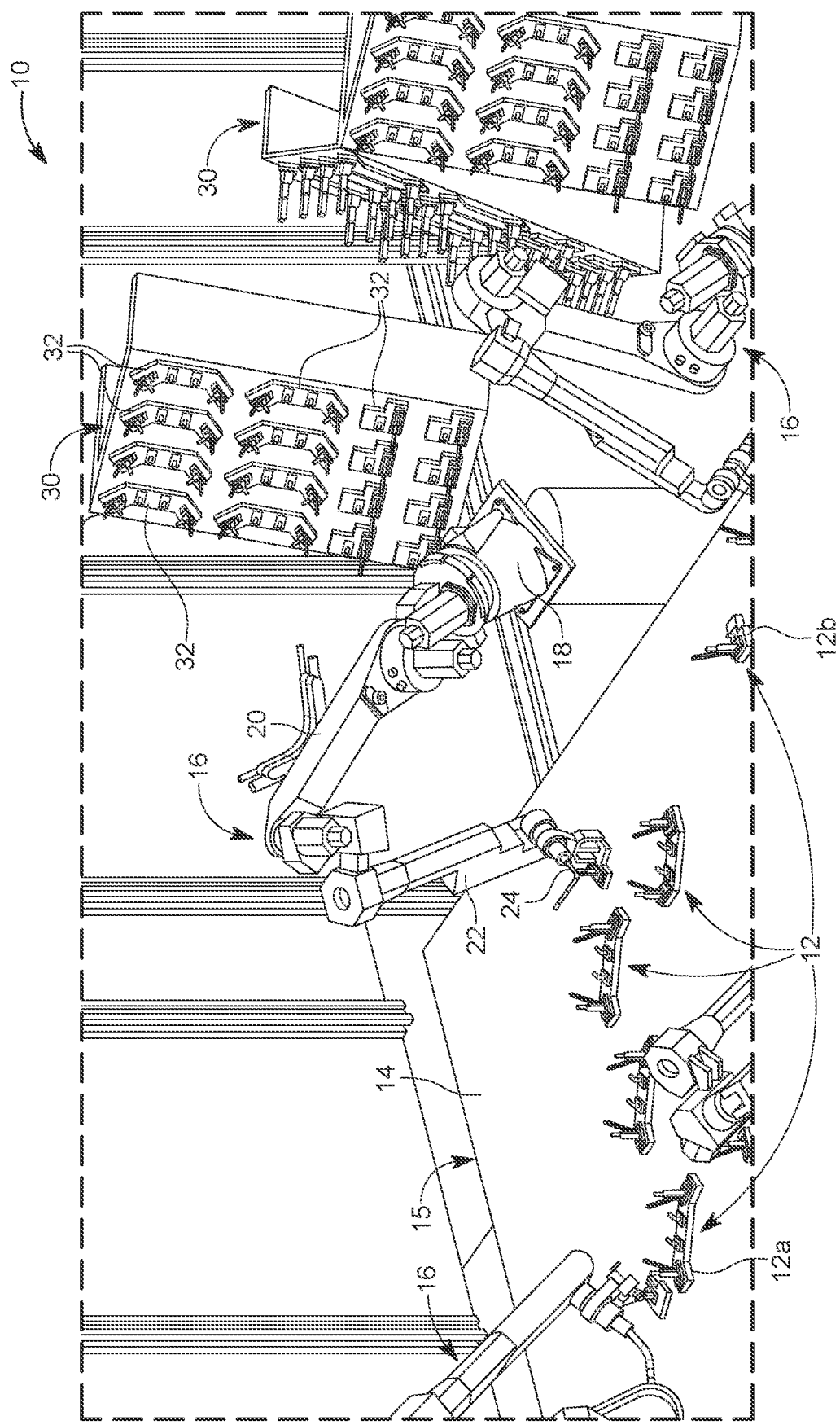
FIG. 1 is a perspective view of an adaptive fixturing system.

Referring to FIG. 1, the numeral 10 generally designates a fixturing system for at least aligning and optionally holding components to be processed. For example, the fixturing system may be used for joining components, such as by welding, gluing, riveting, or molding, into an assembly, or for applying a sealant, insulation or the like, or inserting other components into or between the components in the fixture system.

In the illustrated embodiment, fixturing system 10 is configured for aligning and optionally holding a plurality of components, such as metal tubes, to be joined, such as by welding, into a frame, such as a frame of a recreational vehicle (RV). Although described in reference to a recreational vehicle and metal components that are welded together, it should be understood that the fixturing system described herein, as noted, can be used to align and/or hold other types of components for forming other types of assemblies and which may be processed in other ways, such as noted above.

Figure 2:
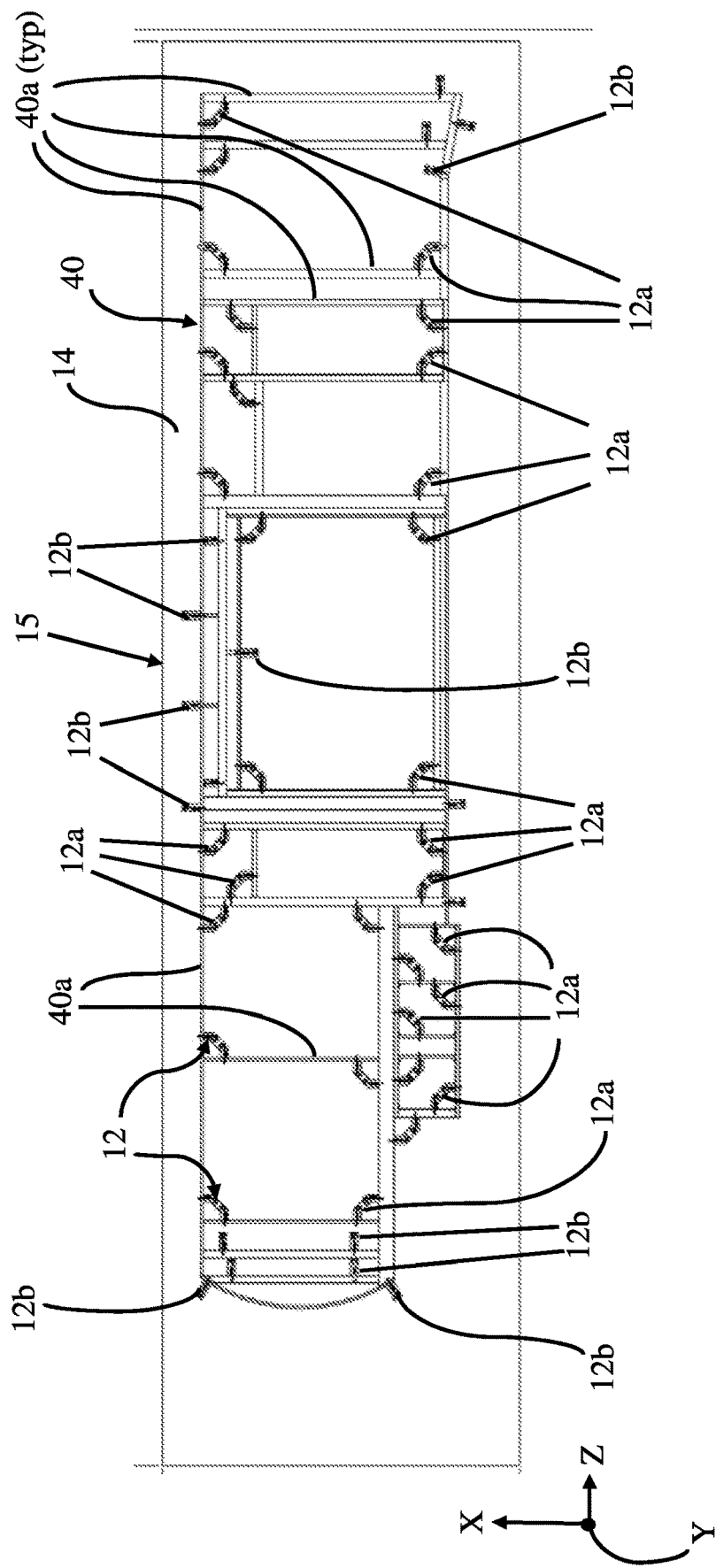
FIG. 2 is a plan view of a work table, such as a weld table, of the fixturing system with the tool fixtures placed in a fixturing arrangement for aligning and optionally holding a plurality of components, such as tubular members, while being joined, such as by welding, to form a sidewall.

Referring again to FIG. 1, fixturing system 10 includes a plurality of tool fixtures 12 arranged on a work surface 14, for example, on the surface of a work table 15 (FIGS. 1 and 2). Work surface 14 may be made from a material that allows a releasable coupling between the tool fixture and the work surface. For example, when the coupling is magnetic, the work surface may comprise a ferromagnetic material so that magnets (more fully described below) can be used to secure the tool fixtures to the work surface, without the need for any locating structures, such as pegboard holes, pins, or the like. In another embodiment, the work surface may be formed from a material that allows for suitable suction coupling—with suction cups mounted to the fixtures or a suction system formed in the work surface (more fully described below). However, as noted below, it should be understood that other couplers may be used to couple the tool fixtures to the work surface, such as VELCRO strips or tacky surfaces provided on the work surface and/or the tool fixtures, depending on the type of processing and the type of components being processed in the fixturing system.

Figure 6:
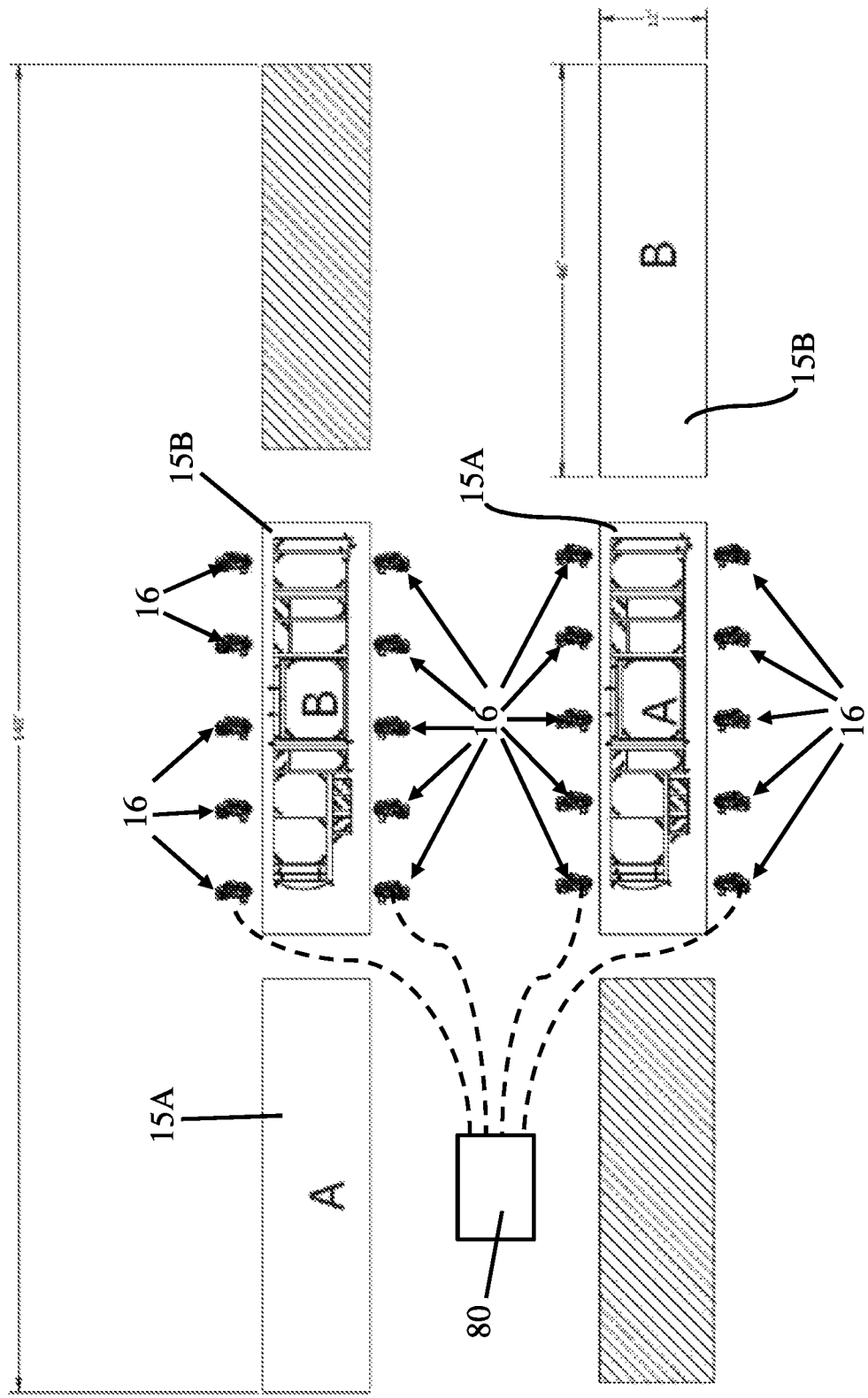
FIG. 6 is a floor plan of a processing system using the fixturing system.

Further, as will be more fully described below, tool fixtures 12 are placed on the work surface by one or more work pieces, for example, work pieces 16a, which may be mounted on robotic arms 16 in a predefined configuration or on an X, Y, Z gantry (or gantries), discussed in reference to FIGS. 6B-6E below. The predefined configuration is dictated by component location data (in CAD files) of the components that are being joined together as an assembly, such as by welding, as well as tool fixture data, which are stored in a computer 80 (FIG. 6). In the illustrated embodiment, computer 80 is in communication with work pieces 16a and robotic arms 16 to control the robotic arms and work pieces. Computer 80 may be either hardwired or wirelessly connected to each robotic arm and each work piece. Though, the tool fixtures may be initially placed on the work surface manually by workers to allow the workers to train the computer and robotic arms about each tool fixture and its tool fixture data.

Each robotic arm 16 may be conventional and includes a base 18 with a base motor, a shoulder 20, which is moved by a base driver, such as an actuator, typically a motor, and which also includes a shoulder driver, such as a shoulder motor, an elbow 22, which is moved by the shoulder motor and which also includes an elbow driver, such as an elbow motor, and a forearm 24, which is moved by the elbow motor and which also includes one or more work pieces at its end for performing various tasks, including a gripper for holding and releasing the tool fixtures and/or a joining unit (e.g. welding unit) for joining (such as by welding) the components together and/or a pneumatic supply line to control pneumatic-based couplers, more fully described below. The terms base, shoulder, elbow and forearms are terms commonly used in the robotic industry referring to the various parts of the robotic arm, with the movable portion of the arm including the shoulder, the elbow and the forearm and, when grippers are used as the work piece, the gripper fingers.

Robotic arms 16 may be positioned with the bases in fixed locations alongside the work surface 14 at opposed sides of the work surface 14 but at spaced intervals that allow access of the robotic arms across the full length and width of the work surface. As is known by those skilled in the art, each robotic arm 16 works in a known defined space. In the illustrated embodiment, each robotic arm 16 works in a known defined space between the work surface and one or more storage racks 30 that provide a plurality of storage locations 32 for storing the various tool fixtures when not in use on the work surface. Optionally, as described below, the robotic arms may be mounted to a movable frame, such as a gantry, that allows them to be moved along the length of the work surface (e.g. table) or across two work surfaces (e.g. two tables), as described in reference to FIG. 6A, so that they have a greater range of motion and which reduces the number of robotic arms needed for processing the components.

For example, in the illustrated embodiment, the storage racks 30 may have a plurality of hooks or other engagement structures that define the storage locations to or on which the individual tool fixtures 12 may be mounted, but easily retrieved therefrom by the robotic arms. Optionally, additional storage racks (not shown) may be provided to store multiple work pieces, if desired, so that they can be changed out during the processing of the components.

As would be understood by those skilled in the art, robotic arms 16 are controlled by a software program stored in the computer that controls the drivers, such motors, of the robotic arms. The computer may be a laptop or a network that is in communication with the laptop, which controls the various drivers and positioning of the robotic arms, as well as controlling the work pieces mounted to the ends of the robotic arms. Suitable offline programs (OLPs) are commercially available, which can be adapted to provide the setup process and programming described below.

Referring to FIG. 2, work surface 14 defines a working space that extends along the X, Z axes and may also extend partially along the Y-axis to form a three-dimensional working space for placing the tool fixtures 12 in their required locations for holding the components to be welded. While the tool fixtures are located with respect to the X, Z axes, the tool fixtures may have a height that introduces a Y component, thus creating a three dimensional working space.

For example, the working space may go to the edge of the table or may be defined by an area within the perimeter of the table. Because the placement of each of the tool fixtures is manipulated by a robotic arm 16 and its work piece 16a, without any locating features, the fixturing function is adaptable and, further, in effect infinite, at least in the plane defined by the X and Z axes. Additionally, the fixturing configuration for the components that are to be joined, such as by welding, may be easily adjusted by simply uploading a different CAD file (or selecting from a menu of CAD files of different assemblies) in the software program.

Referring again to FIG. 2, in the illustrated embodiment, tool fixtures 12 are placed on work surface 14 in an arrangement suitable for holding components to form a sidewall 40 of an RV. Sidewall 40 includes a plurality of horizontally arranged components 40a, such as tubular members, which are joined at various locations, for example by welding or gluing. Tool fixtures 12 may be located at some or each of the joints to be joined, such as by welds, as well as several intermediate locations to hold and/or align the respective components in position between two of the joint locations, for example. Alternately, tool fixtures may be provided only in a few locations, such as intermediate joint locations, for example, when the components are interlocked so that they provide their own holding and/or alignment function. Therefore, it should be understood that the tool fixtures, as noted above, may simply provide one or more alignment surfaces or a holding function that varies from a clamping force to a friction force.

Figure 3:
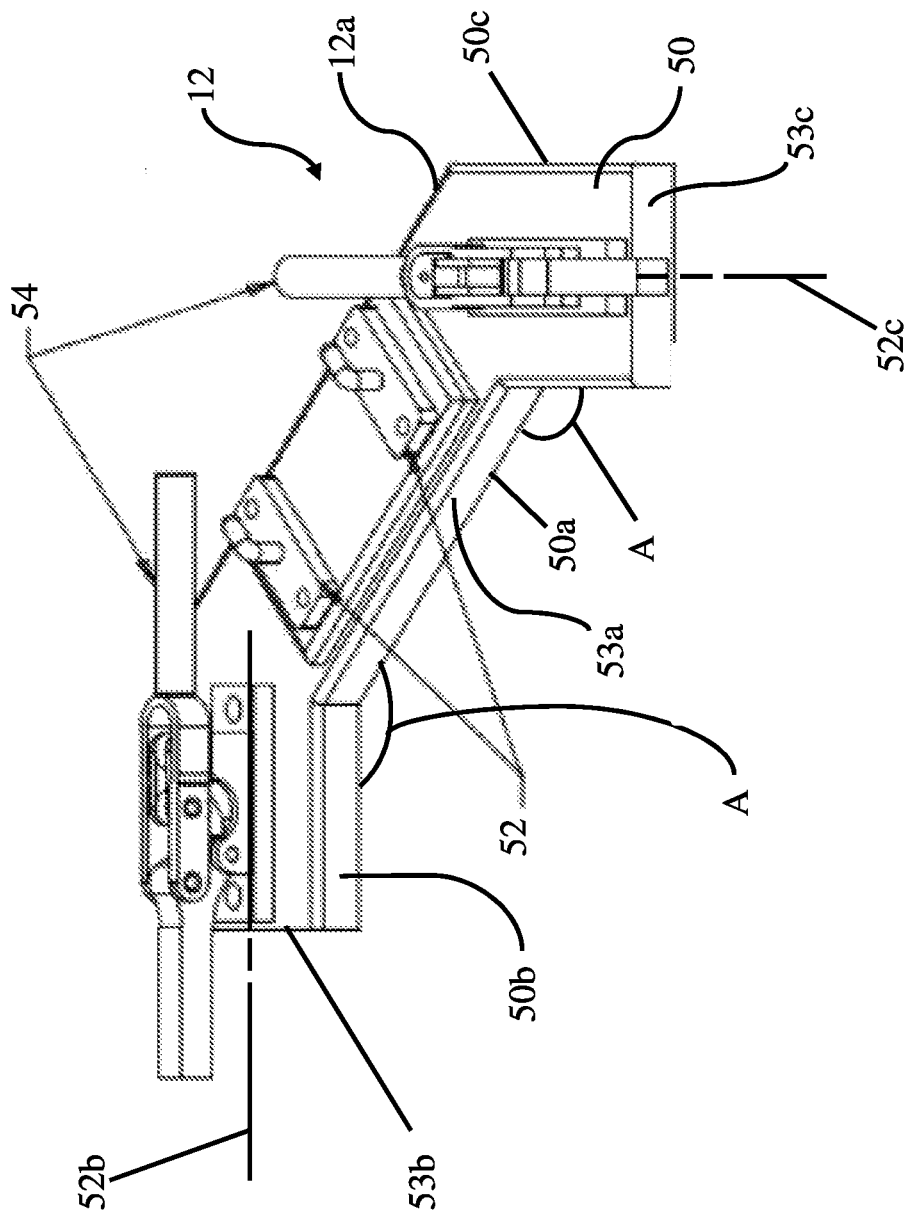
FIG. 3 is an enlarged perspective view of a tool fixture with hold down devices in the form of clamps.

In the illustrated embodiment, tool fixtures 12, therefore, may include several different types of configurations. Referring to FIG. 3, tool fixtures 12 include tool fixtures 12a that hold and align a pair of components at an angle with respect to each other, typically at 90°, and hence provide at least two alignment surfaces in addition to its two clamping surfaces provided by its hold down devices in the form of clamps. Optionally, tool fixture 12a may be configured without clamps and, instead, be configured with a hold down device that simply provides a biasing force and/or a friction force (FIG. 10, FIG. 13) or just one or more alignment surfaces described below in reference to FIG. 13 (which hold at least in one direction along one or more axes).

Referring to FIG. 3, in the illustrated embodiment, tool fixture 12a includes a base 50, one or more releasable couplers, in the form of magnet assemblies 52, and a pair of hold down devices in the form of clamps 54 for holding the respective components to be welded. For example, base 50 may comprise a plate, including a plastic plate formed from a phenolic plastic plate, a metal plate, a wooded plate, or a composite plate, such as a reinforced plastic plate.

Magnet assemblies 52 may be configured so that their magnets are activated where they are in an activated or coupling state (where the magnet can magnetically couple the tool fixture to the work surface) and deactivated where the magnetic is in a non-coupling state (where the magnet does not magnetically couple the tool fixture to the work surface). Suitable magnet assembly may comprise a magnet assembly that has a mechanical actuator (52a, FIG. 4) that supports an armature and moves the armature (e.g. rotates armature) to collapse the magnetic field to allow the magnet to decouple or move the armature to allow the magnet to couple to the work surface, as described above. As will be more fully described below, this mechanical actuator of the magnet assembly may be operated by robotic arms 16 to activate or deactivate the magnet, as noted above. Suitable magnetic assemblies are commercially available, for example from Magswitch of Colorado, U.S.A.

In another embodiment, the magnets may remain activated, with the release from the work surface being achieved by simply applying a sufficient force with the work piece to decouple the magnet and fixture from the work surface. In yet another embodiment, the magnet can be moved between an operative, coupling position and an inoperative position, for example, by a mechanical or pneumatic actuator, which may be controlled by the work piece or through a pneumatic system controller by computer 80.

Clamps 54 also may comprise a commercially available hold down clamp where each clamp has an articulating handle that moves a hold down member, such as a bar, from a stowed position to an operative position where it can clamp down on a component onto a work surface 14 to thereby hold the component in a desired orientation for processing, e.g. welding or gluing.

In the illustrated embodiment, base 50 of tool fixture 12a includes a central rectangular portion 50a, where magnet assemblies 52 are mounted and, optionally, mounted in a spaced relationship to provide a space there between where the work piece (e.g. gripper) of robotic arm 16 can engage the respective tool fixture (referred to as QSB below). In the illustrated embodiment, base 50 is configured to hold components at an angle, such as 90°, with respect to each other and, therefore, supports clamps 54 at a 90° orientation with respect to each other.

To facilitate the registration process described fully below, base 50 may include a pair of right angle trapezoidal portions 50b and 50c that extend from opposed sides of central rectangular portion 50a. Portions 50b, 50c form an angle A, such as a 135° angle, from their shorter parallel sides to the inwardly facing side 53a of central portion 50a, with their squared ends providing alignment surfaces 53b, 53c, again more fully described below.

Clamps 54 are mounted on the angled portions and, further, centrally located along the longitudinal axis 52b, 52c of the respective angled portions 50a, 50b and are configured so that when their hold down members are deployed to their clamping position they hold down a component that is positioned adjacent and abutting their alignment surfaces 53b, 53c and, hence, are oriented orthogonally to the clamping axis (axis along which the hold down member moves when moved to its clamping position). Placement of these components adjacent the tool fixtures 12 may be done using robotic arms or manually, as described in reference to FIG. 6.

Figure 4:
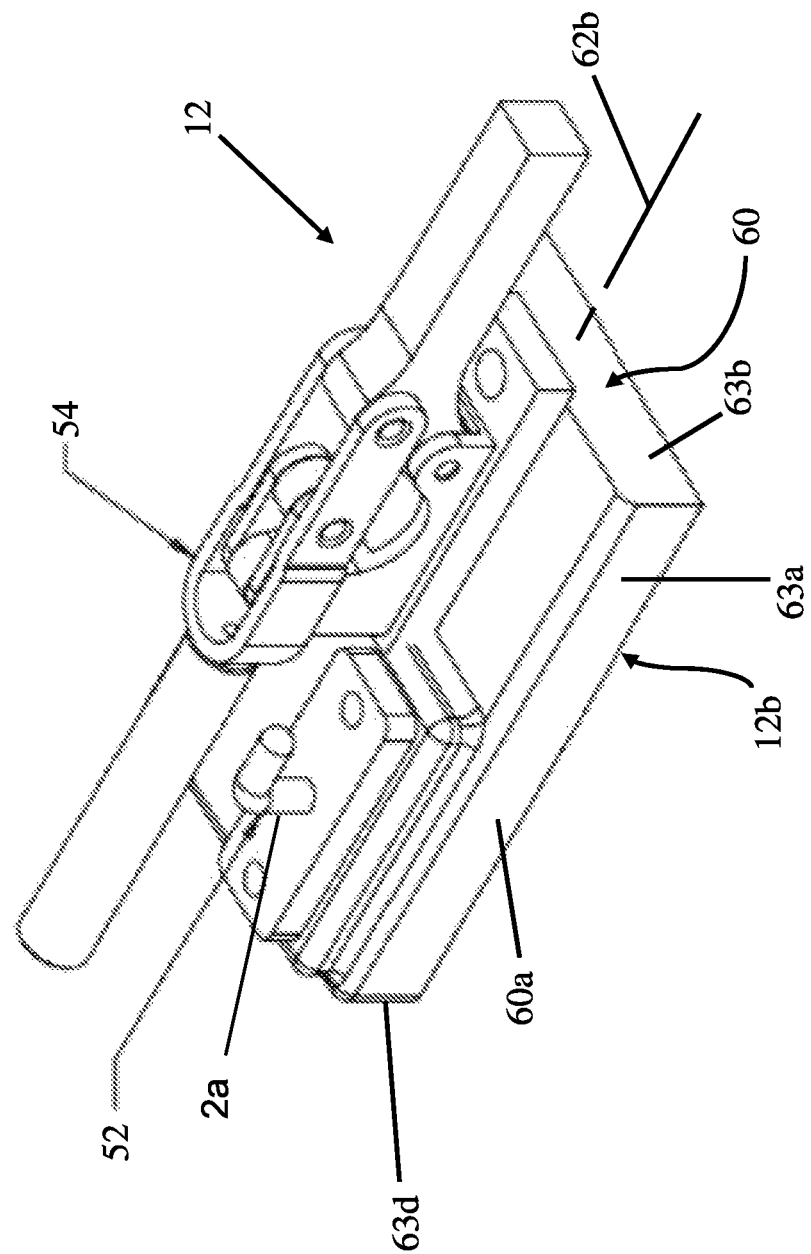
FIG. 4 is an enlarged perspective view of another embodiment of a tool fixture.

Referring to FIG. 4, tool fixtures 12 also include tool fixtures 12b that are configured to hold and align a single component in a desired orientation, for example, orthogonally to one side of the tool fixture. For example, tool fixture 12b includes a single clamp 54 mounted to a base 60. Base 60 is rectangular and includes two pairs of opposed sides (60a shown) and two pairs of opposed surfaces 63b, 63d, at least two of which (63a, 63b) form alignment surfaces—with surfaces 63a, 63b for aligning the tool fixture against the reference fixture 70 (described below) and surface 63b providing an alignment surface for the component when being clamped by clamp 54, which is aligned and parallel to the central longitudinal axis 62b of the base 60.

In the illustrated embodiment, similar to tool fixture 12a, alignment surface 63b is orthogonal to the clamping axis (axis along which the hold down member moves when moved to its clamping position), while alignment surface 63a is parallel to the clamping axis and is used to determine the weld offset data, as described below. Placement of these components adjacent the tool fixture 12b may also be done using robotic arms or manually, as described in reference to FIG. 6.

Alternately, as described above, when the tool fixture of FIG. 4 is formed with a square carrier or base, then the tool fixture may provide multiple alignment surfaces with or without any additional restraints (i.e. with or without any clamps), such as described in reference to FIGS. 10-15 below.

Figure 10:
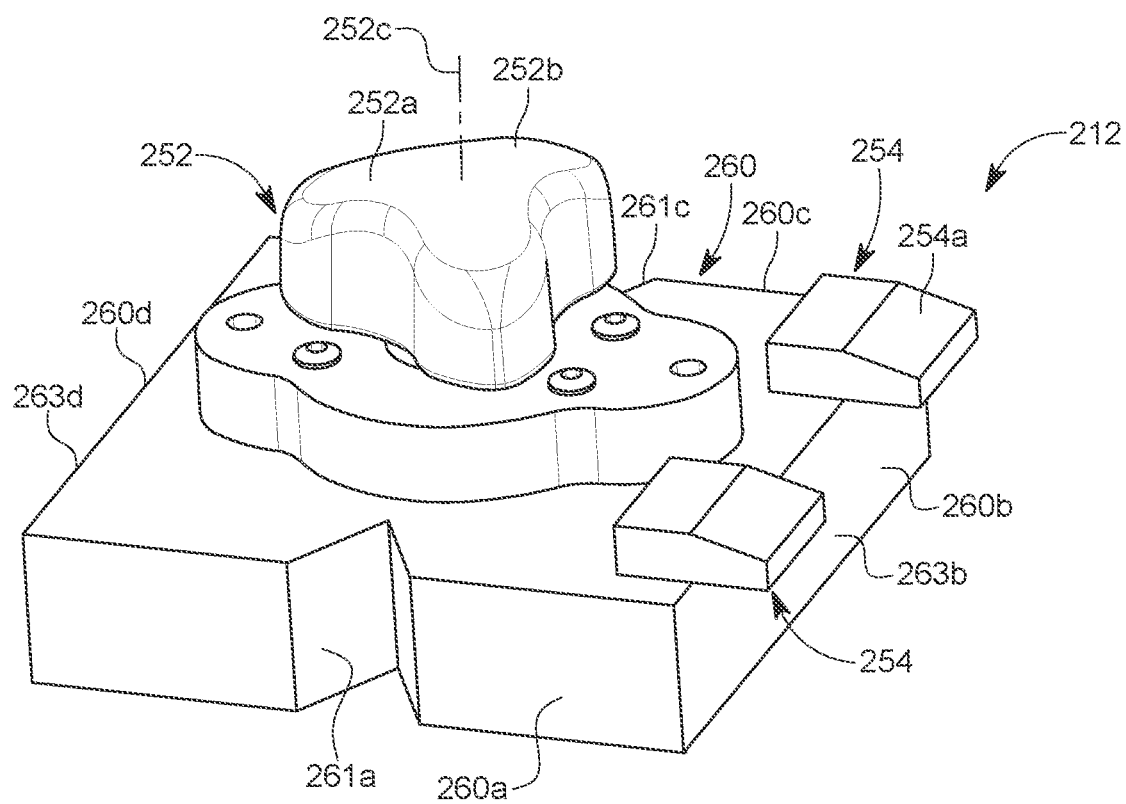
FIG. 10 is a schematic elevation view of the tool fixture with an alternate embodiment of the hold down devices that may generate a biasing and/or friction force on the component(s) or simply form a stop.
Figure 11:
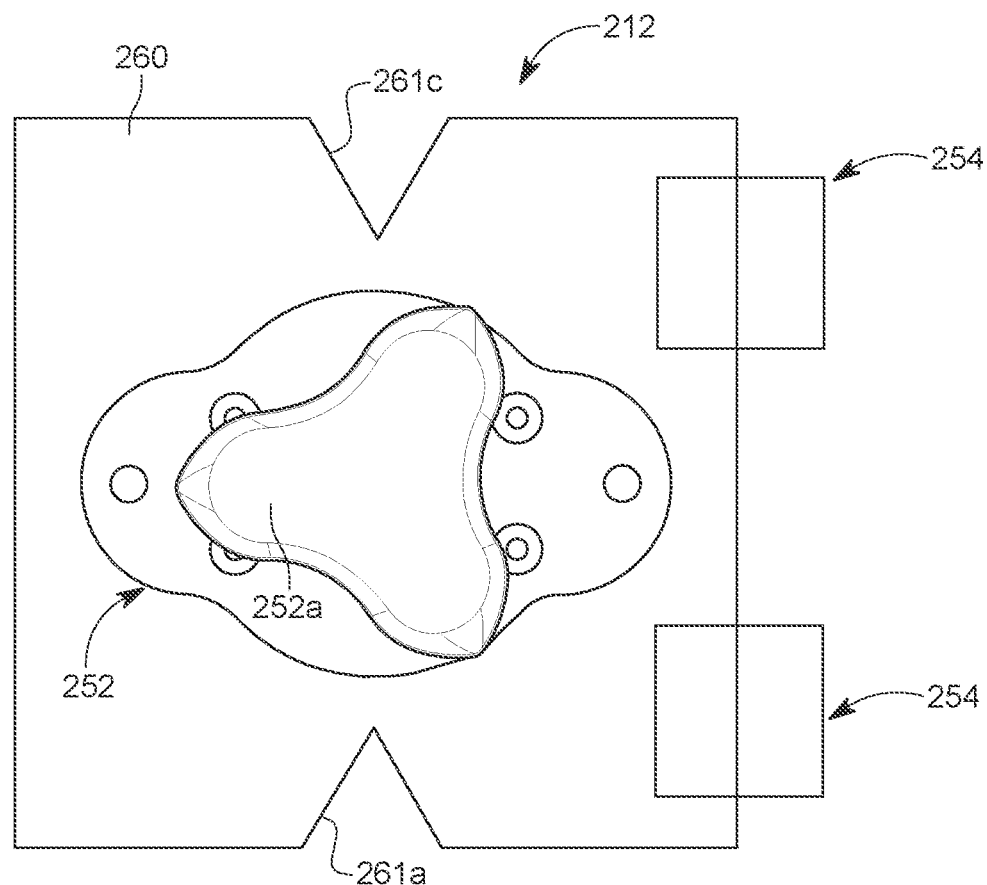
FIG. 11 is a top plan view of the tool fixture of FIG. 10.
Figure 12:
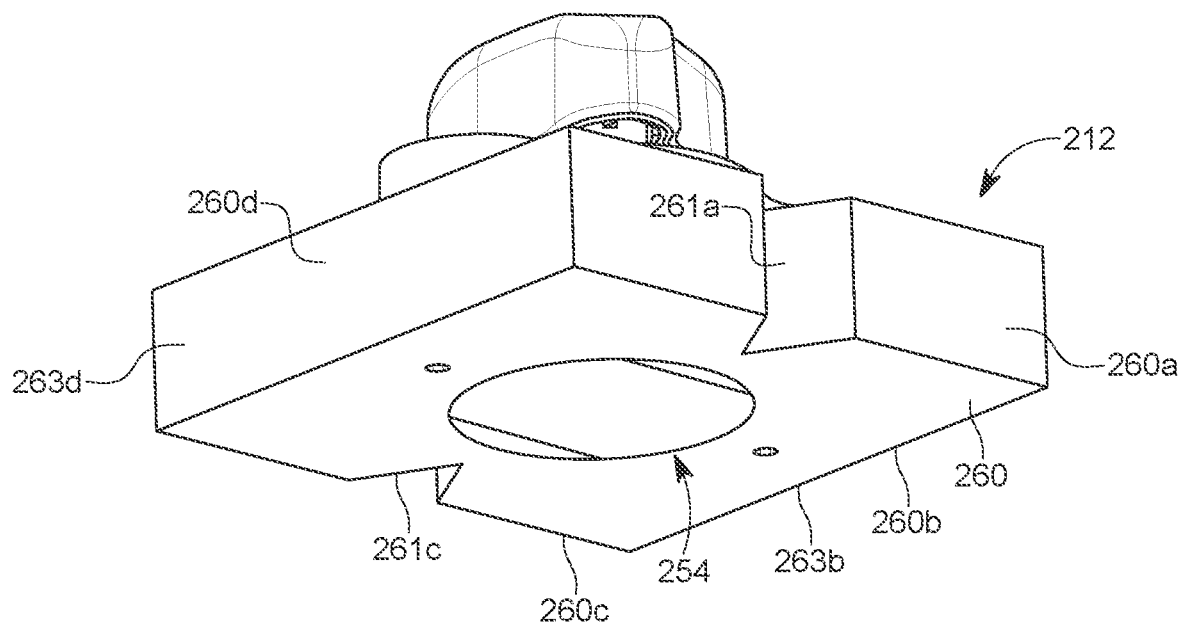
FIG. 12 is a bottom perspective view of the tool fixture of FIG. 10.

Referring to FIGS. 10-12, the numeral 212 designates another embodiment of a tool fixture. Tool fixture 212 is configured to provide at least two or optionally four alignment surfaces 263a, 263b, 263c, and 263d on the respective opposed sides 260a, 260b, 260c, and 260d of base 260, to provide one or two pairs of orthogonal alignment surfaces for aligning the tool fixture to the reference fixture 70 and one or two alignment surfaces (263b and 263d) for aligning a component relative to the tool fixture and the work surface.

Similar to the previous embodiments, tool fixture 212 includes a base 260 and a releasable coupler, for example, in the form of a magnet assembly 252, which is mounted to the base. Similar to magnet assembly 52, magnet assembly 252 may include a magnet (not shown), an armature (not shown), and a mechanical actuator 252a. Suitable magnetic assemblies are commercially available, for example from Magswitch of Colorado, U.S.A. For examples of other magnet arrangements and other couplers, reference is made above to fixtures 12 and fixture 412a described below.

As described above in reference to magnet assembly 52, mechanical actuator 252a may be coupled to the armature and can be manipulated by the robot arm to move the armature to a coupling position to activate the magnet (where the magnet can couple the tool fixture to the work surface) or to a position where the magnetic field of the magnet is collapsed to deactivate the magnet and, therefore, can no longer magnetically couple the tool fixture to the work surface.

In the illustrated embodiment, base 260 comprises a square base, with gripping surfaces 261a, 261c provided on opposed sides 260a, 260c between the alignment surfaces 263b, 263d. The gripping surfaces are notch shaped and are aligned with the center of the base 260 and, further, with actuator 252a.

In the illustrated embodiment, actuator 252a comprises a tri-lobe knob 252b with a central axis of rotation 252c. Optionally, gripping surfaces 261a are aligned with the knob 252b and central axis of rotation 252c. In this manner, when the robotic arm grips base 260, the computer can know the location of the knob and then activate that portion of the robotic arm that can grip and rotate the knob.

Optionally, tool fixture 212 includes one or more hold down devices 254 associated with one or more alignment surfaces. In the illustrated embodiment, tool fixture 212 includes a pair of hold down devices 254 associated with alignment surface 263b of base 260. In this manner, the tool fixture may be rotated to provide two functions—an alignment function on one side and an alignment and hold down function on the other.

Further, in the illustrated embodiment, each hold down device 254 may be in the form of a tab or flange that forms an arm 254a, optionally formed from an elastic material, such as a rubber, that extends from side 260b to provide positive downward forces on the component generally at all times. Arms 254a are cantilevered from side 260b to form an overhang and may be secured to base 260 by an adhesive or a fastener (not shown). Arms 254 may also be molded with base 260 either using the same material or a different material, for example, by co-injection or two-shot molding.

In one embodiment, the space between the overhang (e.g. the underside) of arms 254a and the work surface may be slightly smaller than the height of the component. Thus, when aligning the component with the tool fixture, a force is required to insert the component beneath the arms 254 that is sufficient to flex arms 254a upwardly, thus creating a downward spring force on the component. Optionally, in some cases to facilitate this insertion, the wedge shaped configuration of arms 254a as shown in FIG. 10 may be inverted to form a cam surface with the sloping or angled side.

Alternately, the space between the overhang (e.g. underside) of arms 254a and the work surface may be approximately equal to the height of the component so that only a force to overcome the friction between the arms and the component need be applied.

In yet another embodiment, the space between the overhang (e.g. underside) of arms 254a and the work surface may be slightly greater (e.g. an air gap) than the height of the component so that arms 254a form a stop and provide restraint only if the component tries to lift up off the work surface when being processed. It should be understood that holding devices 245 may also be provided on the opposed side 260d of fixture 212. Alternately, holding devices may be omitted. Further, other types of hold down devices may be used, including the clamps described above.

Referring to FIGS. 13-15, the numeral 312 designates another embodiment of a tool fixture. Tool fixture 312 is configured with a round base 360 so that it provides multiple alignment points, such as alignment points 363b (FIG. 13) and 363d (FIG. 14), at tangent points on the opposed surfaces of base 360 for aligning a component (versus the planar surfaces of the above fixtures), which provide greater flexibility for possible variations in the component shape or tolerances. Therefore, by using alignment points (or lines) versus surfaces, the possibility of introducing movement into the component, such as by introducing an unwanted angular orientation to the component, is reduced, if not eliminated.

Similar to the previous embodiments, tool fixture 312 includes a releasable coupler optionally in the form of a magnet assembly 352, which is mounted to base 360. In the illustrated embodiment, the magnet assembly 352 includes a pneumatic based actuator (not shown). The pneumatic-based actuator moves an armature to activate the magnet (or magnets) between its activated state and deactivated state and is controlled by air introduced into the magnet assembly 352 via a pneumatic port 352a, for example, at the top side of base 360. Air is supplied to pneumatic port 352a via a pneumatic line provided on robotic arm 16 and controlled by computer 80. Suitable pneumatic-based magnetic assemblies are commercially available, for example from Magswitch. However, as noted above, the fixture may instead have a fixed magnet that has an actuator that moves an armature to change the magnetic field of the magnet or a magnet that is normally activated and simply decoupled from the work surface by force. Or the coupler may comprise a pneumatic coupler described below.

As noted above, in the illustrated embodiment, base 360 comprises a circular base with gripping surfaces formed by apertures 361a, 361b. As best seen in FIG. 14, apertures 361a, 361b are formed in the top surface 360a of base 360 and are aligned along an axis 360b that extends across base 360 to the opposed terminal edges of hold down devices 354. Apertures 361a, 361b are engaged by a work piece with movable gripping pins, mounted to the robotic arms 16.

The opposed terminals ends of hold down devices are aligned on opposed sides of axis 360c, which is perpendicular to axis 360b. In addition, both axes 360b and 360c extend through the center of pneumatic port 352a. In this manner, when computer 80 engages the gripping surfaces, the computer using the stored data of the tool fixture will know where the hold down devices are located and, further, where the pneumatic port 352a is located so that the robot arm's pneumatic line may be coupled to the pneumatic port to control the magnet assembly 352. Additionally, as described below, the computer can then determine the offsets for the fixture to be able to accurately locate the fixture in the working space.

Optionally, tool fixture 312 includes two different hold down devices 354a, 354b. For example, in the illustrated embodiment, each hold down device 354a, 354b is a segment of an annular flange or tab that forms an arcuate projection. For example, similar to the above embodiments, the hold down devices 354a, 354b may be formed from an elastic material, such as rubber, so that they too may form a spring to apply a biasing force on the component extended under the respective hold down device, or provide an interference fit, or simply provide a stop to limit upward movement of the component, as described above.

Similar to the previous embodiment, tool fixture 312 may be rotated and provide two different alignment/holding arrangements. In the illustrated embodiment, tool fixture 312 may be rotated to provide two hold down device heights to accommodate different sized components. For example, hold down device 354a may be spaced above the bottom surface of base 360 a distance X1, and hold down device 354b may be spaced above the bottom surface of base 360 a distance X2, where X1 is greater than X2. Optionally, similar to the previous embodiment, one or both hold down devices may be omitted.

In the illustrated embodiment, hold down devices 354a, 354b extend around a ninety degree arc of base 360; however, it should be understood that they may extend over a smaller arcuate range or a greater arcuate range, provided they do not create an interference with reference tool 70 when determining their offset.

Figure 3A:
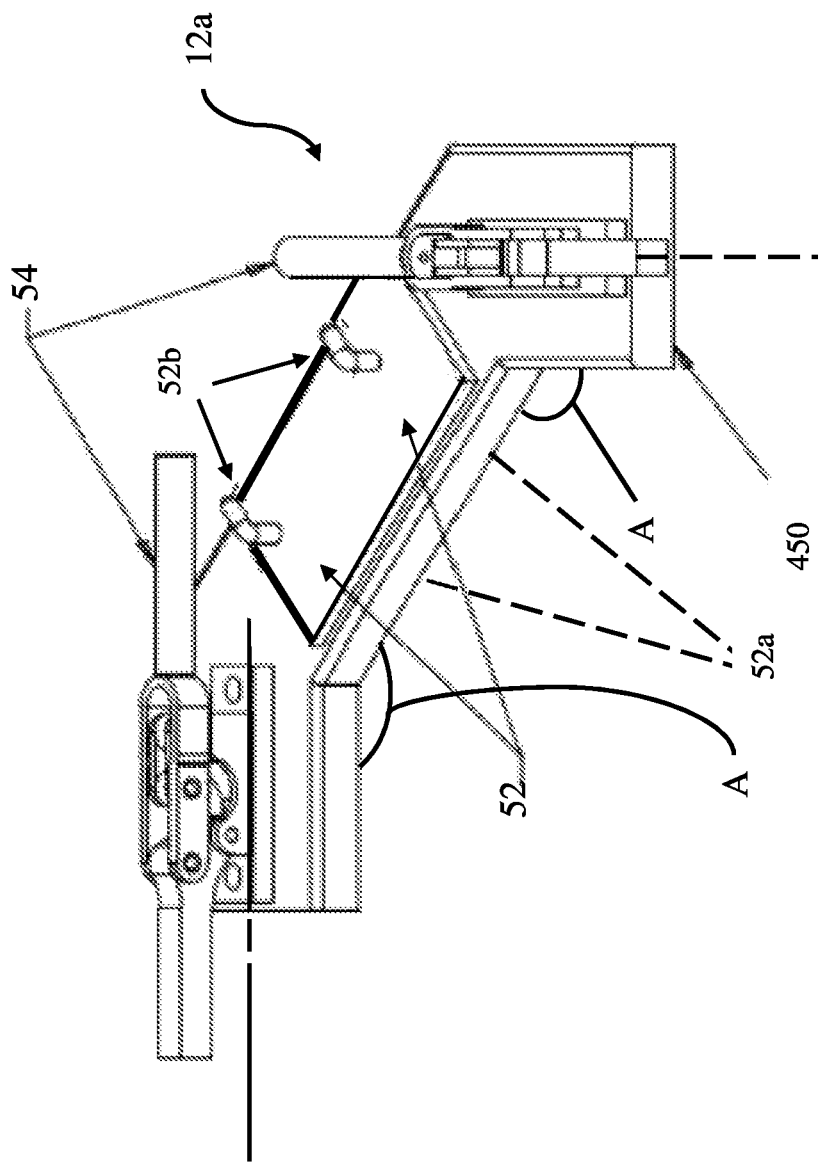
FIG. 3A is an enlarged perspective view of another embodiment of the tool fixture with hold down devices in the form of clamps.

As noted above and referring to FIG. 3A, in another embodiment, tool fixture 412a includes a base 450, similar to base 50, one or more releasable couplers in the form of pneumatic assemblies 452, and a pair of hold down devices, such as clamps 54, for holding the respective components to be welded. For more details of base 450 and clamps 54 reference is made to fixture 12a. Further, it should be understood that the fixture may be configured with the bases and/or hold down devices of any of the above embodiments.

Figure 3B:
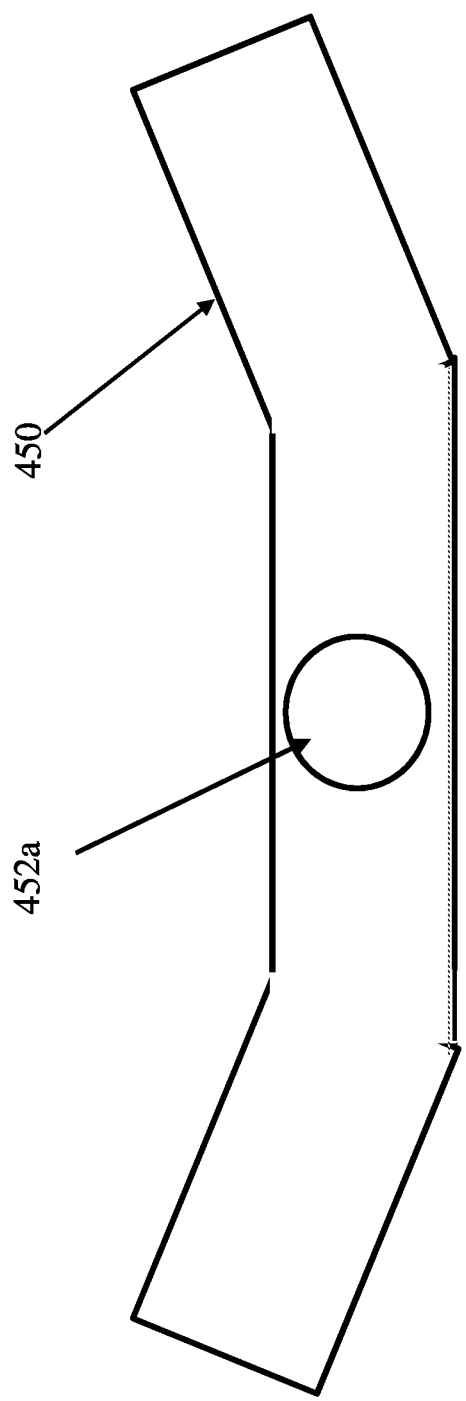
FIG. 3B is a bottom plan view of the base of FIG. 3A illustrating the couplers in the form of a suction device.

Pneumatic assemblies 452 are configured with one or more suctions devices 452a, such as suction cups, mounted to the underside of base (see FIG. 3B) which when in an activate or coupling state the suction devices can couple the tool fixture via suction to the work surface or when a deactivated state where the suction devices is in a non-coupling state, the suction devices no longer produces sufficient suction to couple the tool fixture to the work surface. Suitable suction devices are in communication with pneumatic, suctions lines 452b (FIG. 3A), which in turn are in communication with a pneumatic system, controlled by computer 80. Suitable suction devices include: Vacuum activated suction cups, such as available from All Vac Industries; mechanically, including manually, activated such cups, such as available from Stanley; and suction seal suction devices, such as is available from Anver Corporation.

In yet another embodiment, work surface 14 may be configured to provide the releasable coupling in an infinite number of positions. For example, the work surface may have a tacky upper surface that releasably adheres to the fixture. A tack surface maybe alternately or in addition provided on the fixture, for example, on the bottom surface of the base. In another embodiment, the work surface may be porous, for example, by the porous openings in the material forming the upper surface or via openings formed in the upper surface. The openings in the upper surface are then in fluid communication with a plenum beneath the upper surface, which is then coupled to a pneumatic system that generates suction at the upper surface and thereby releasably holds the fixtures in place.

As noted above, any of the tool fixtures 12a, 12b, 212, 312, and 412a may be placed on work surface 14 by robotic arms 16 or work pieces 16a (e.g. on a gantry or gantries), which are controlled by a computer, which has stored therein component location data (e.g. CAD data) for the component and assembly being assembled, in this case by welding, and tool fixture data for each tool fixture in the system. The computer is configured to control the robotic arm and/or work pieces to retrieve the tool fixtures from their respective storage locations based on the tool fixture data and to place said tool fixture on the work surface at a tool fixture location based on the component location data and the tool fixture data.

For example, the component location data may include process locations, such as joint locations, including weld joint locations. The tool fixture data includes a unique tool fixture identification for each tool fixture in the system, a storage location identification for each tool fixture in the system, and offset data (also referred to as offset), described below, and an optional fixture orientation data.

In one embodiment, the computer is configured by software to control the robotic arms 16 to place the required tool fixtures on the work surface at the tool fixture locations for aligning and optionally holding the components during processing, such as joining, including welding, which are offset from the process locations, such as weld locations. As described more fully below, this offset is determined for each tool fixture and then associated with each tool fixture in the computer software program when the tool fixture is first or reintroduced (e.g. due to repair or replacement) into the fixturing system so that the computer knows precisely where to place the tool fixture on the working space.

Figure 5:
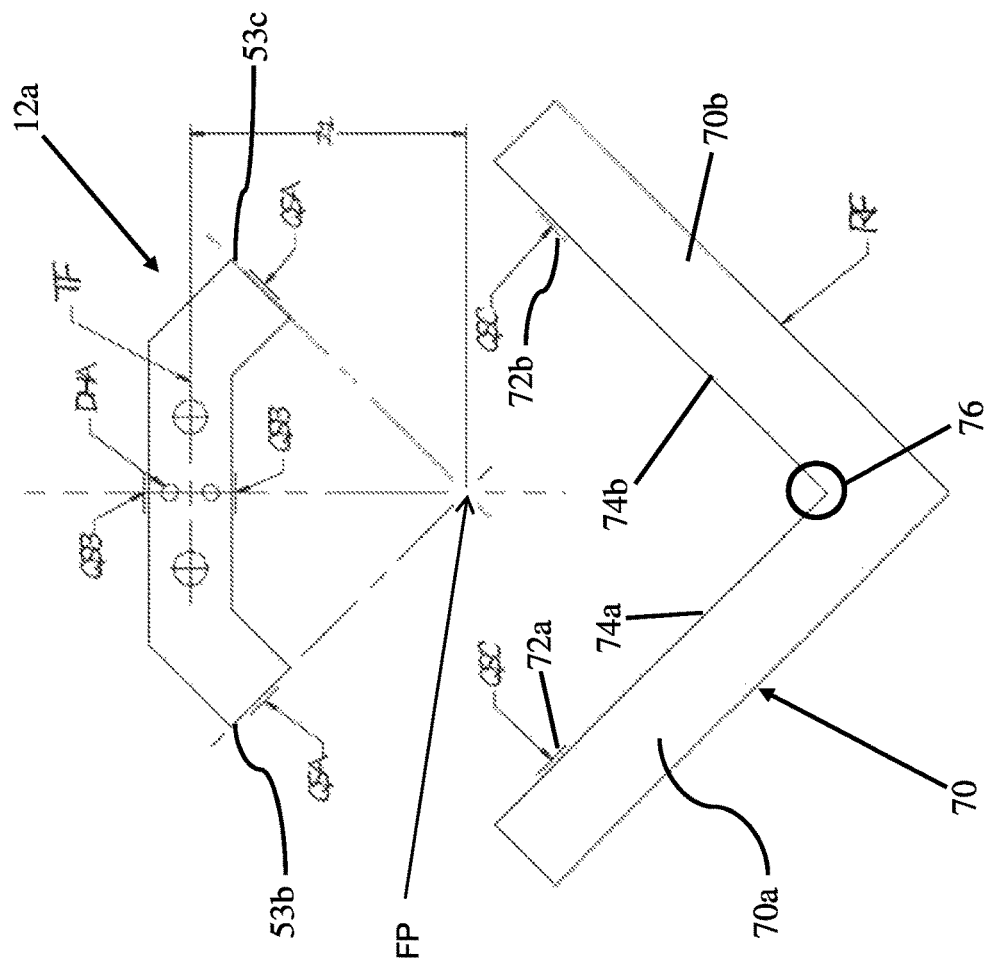
FIG. 5 is an enlarged schematic of a reference fixture used to determine the offsets of the tool fixture of FIG. 3.

Referring to FIG. 5, in the illustrated embodiment, in order to determine the offset for each tool fixture, which allows the computer to precisely place the tool fixtures on the work surface 14, system 10 includes a reference fixture 70. Reference fixture 70 is placed in a known location, for example, along at 0, 0 of X, Z-axes of the working space defined on work surface 14. For example, in the illustrated embodiment, reference fixture 70 has an L-shaped configuration with two arms 70a, 70b formed at right angles to each other. Arms 70a and 70b define contact surfaces 72a, 72b (labeled QSC in FIG. 5) on their inwardly facing sides or surfaces 74a, 74b.

For tool fixture 12a (or fixture 412b), alignment surfaces 53b, 53c (labeled QSA in FIG. 5) are aligned with contact surfaces 72a, 72b (labeled QSC in FIG. 5) to precisely align the respective tool fixture 12 with the reference fixture 70 so that the projected fixture point of the corner position (labeled FP in FIG. 5, for example, which is where the weld of the two components being joined by the tool fixture will be located) will coincide with the intersection 76 of the two inner sides 74a, 74b of reference fixture 70.

Because the computer knows the precise location of both the reference fixture (which is input into the computer by an operator, for example, when the reference fixture is mounted to the work surface, e.g. by magnets or by location structures) and the tool fixture (which is known when the robotic arm engages the tool fixture at a specified gripper location) (labelled labeled QSB in FIG. 5) when it is aligned with reference fixture 70, the offset (labeled Z1 in FIG. 5) can be calculated. By knowing the precise location of the reference fixture (e.g. by placing the intersection of the inwardly facing sides 74a, 74b reference fixture 70 at 0, 0 on the X, Z axes) and the precise location of the center of tool fixture 12a, the computer can calculate the offset (Z1) from the center of the tool fixture 12a to the corner position or joint location of the components for that particular tool fixture, which as noted coincides with the intersection of the inwardly facing sides 74a, 74b.

A similar procedure is used for fixtures 12b, but instead of aligning the fixture 12b with both contact surfaces 72a, 72b (labeled QSC in FIG. 5) at the same time, alignment surface 60a of fixture 12b is placed and aligned with contact surface 72a, and then fixture 12b is moved inwardly along facing side 74a until alignment surface 63b aligns and contacts the other contact surface 72b.

For tool fixture 212, a respective side (260a or 260c) and an alignment surface (263b or 263d) are aligned with contact surfaces 72a, 72b (labeled QSC in FIG. 5) in a similar manner to fixture 12b. As noted, the orientation of the tool fixture can be selected between two different orientations depending on whether hold down devices are desired or not, as noted above. Once aligned with the reference fixture, the computer can then determine the offset to the process location for the tool fixture.

Similarly, tool fixture 312 is located so that its alignment points are aligned with the respective contact surfaces 72a, 72b (labeled QSC in FIG. 5) to orient the tool fixture in one of two orientations to select the appropriate height of the hold down device for a given component. Again, once aligned, the computer can determine the offset to the process location for the tool fixture.

In addition, the computer assigns a tool fixture identification to each tool fixture 12, associates the offset with tool fixture identification of the respective tool fixture, and stores the offsets in association with the tool fixture identification for each of the respective tool fixtures in memory. For the cases where the fixtures have more than one orientation, the orientation of the respective tool fixture is also associated with the tool fixture identification, so for example, each tool fixture may have two tool fixture identifications—one with one orientation, and the other with a second orientation. Alternately, the orientation may be separate orientation data associated with the tool fixture identification.

In one embodiment, either in response to an operator requesting the computer to check the offset of a tool fixture (or offsets of more than one or all the tool fixtures) or based on a passage of time, the computer is configured to check the offsets of each respective tool fixture against the reference fixture and compare the checked offset to the stored offset for the tool fixture or fixtures to determine wear or damage to the respective tool fixture. Optionally, the computer may change the offset in memory to the new offset for each fixture where there is a deviation above a set threshold (for example 0.1 mm) or remove the tool fixture (or tool fixtures) from the system for repair or replacement when the deviation is above a greater threshold. Once the repaired or replacement fixture is introduced into the system, its offset will be determined using the same process described above and stored along with its unique tool fixture identification.

Figure 7:
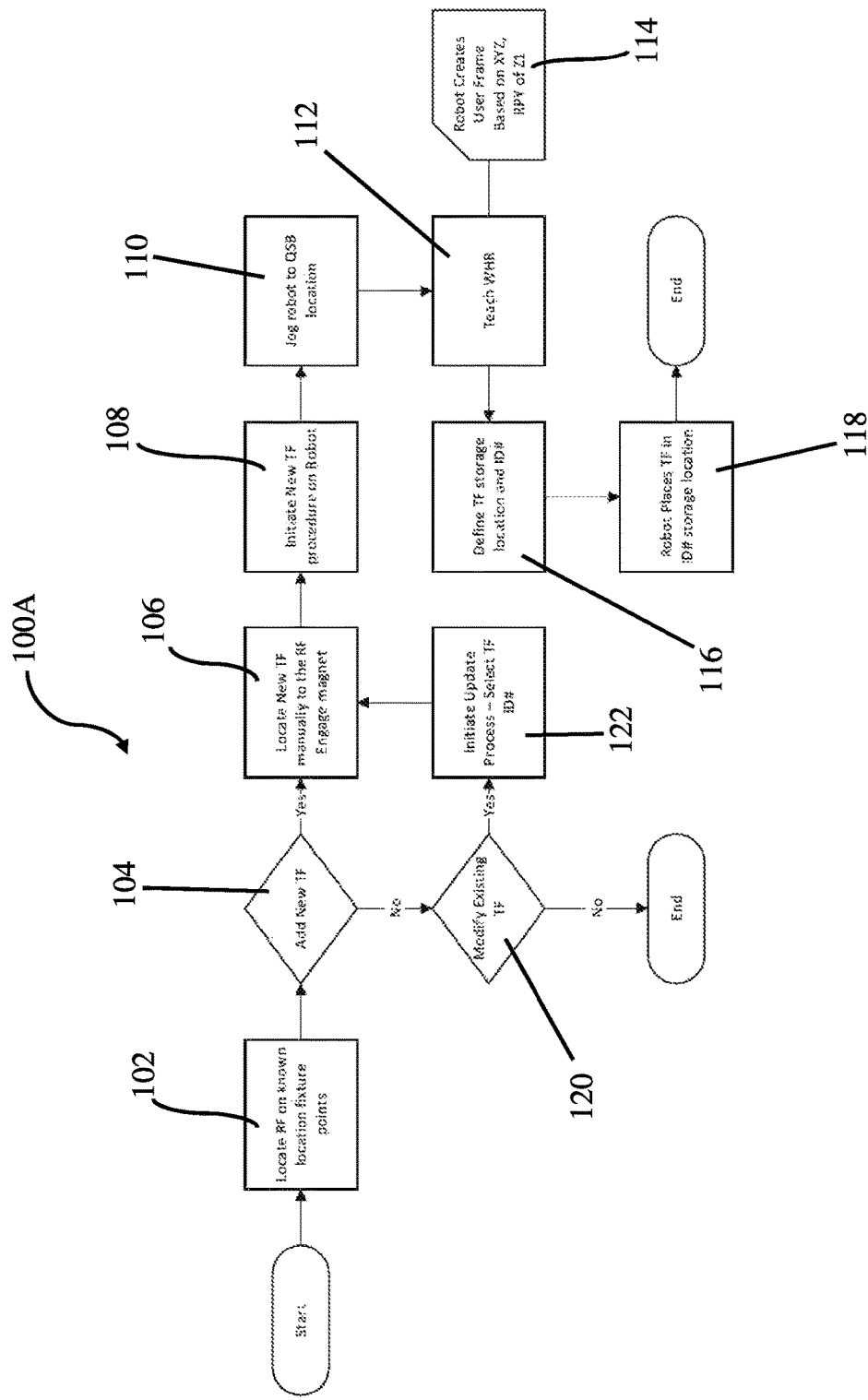
FIG. 7 is a flowchart of a setup process of the fixturing system.

Referring to FIG. 7, as understood from above, the setup process 100a includes locating a reference fixture (RF) in a known location (102). When adding a new tool fixture (TF) (104) to system 10, the new tool fixture (TF) is manually located with the reference fixture (106) so that alignment surfaces (e.g. 53b, 53c) align with the contact surfaces 72a,72b (QSC) surfaces on reference fixture 70 (110). The robotic arm 16 is then moved (e.g. jogged) and controlled to engage the tool fixture at the gripping surface (QSB), e.g. between the magnet locations (on fixture 12a) or at the magnet location for fixture 12b. Once engaged with the fixture, the computer creates a user frame based on the XYZ coordinates and determines the offset Z1 (114) to teach the robotic arm and its work holder the tool fixture. Further, the computer assigns a tool fixture identification and a storage location to each tool fixture (116). After the registration process, the computer instructs the robotic arm 16 to move the tool fixture to its storage location (118) for later retrieval.

As noted above, the offset for a tool fixture may be updated by selecting the tool fixture identification (and optional orientation) into the computer and initiating an update process (122) for that tool fixture. Steps 106-118 are then repeated for the updated tool fixture. Similarly, when replacing a tool fixture it can be introduced as a new tool fixture generally following the steps 106-118.

Figure 8:
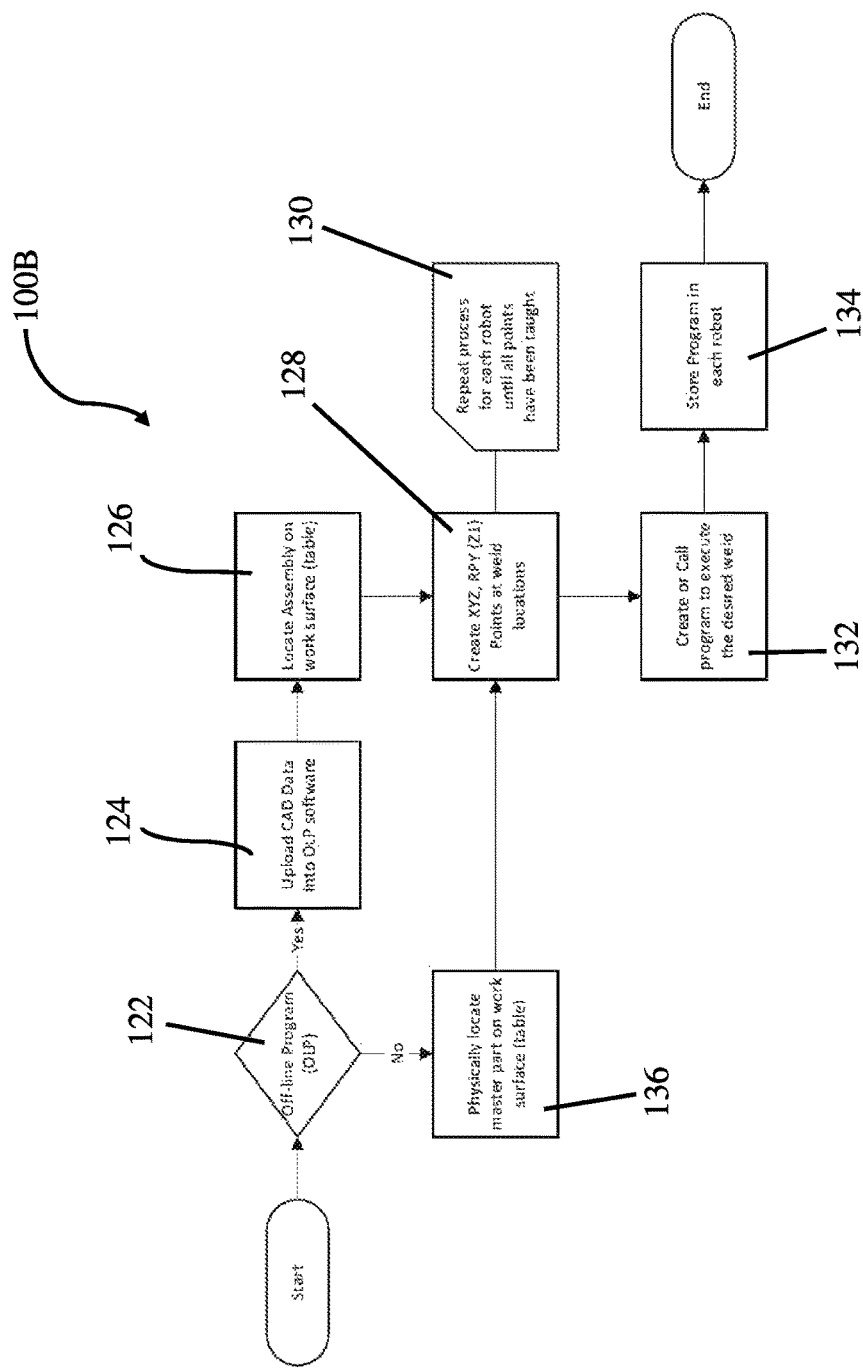
FIG. 8 is a flowchart of the assembly programming.
Figure 9:
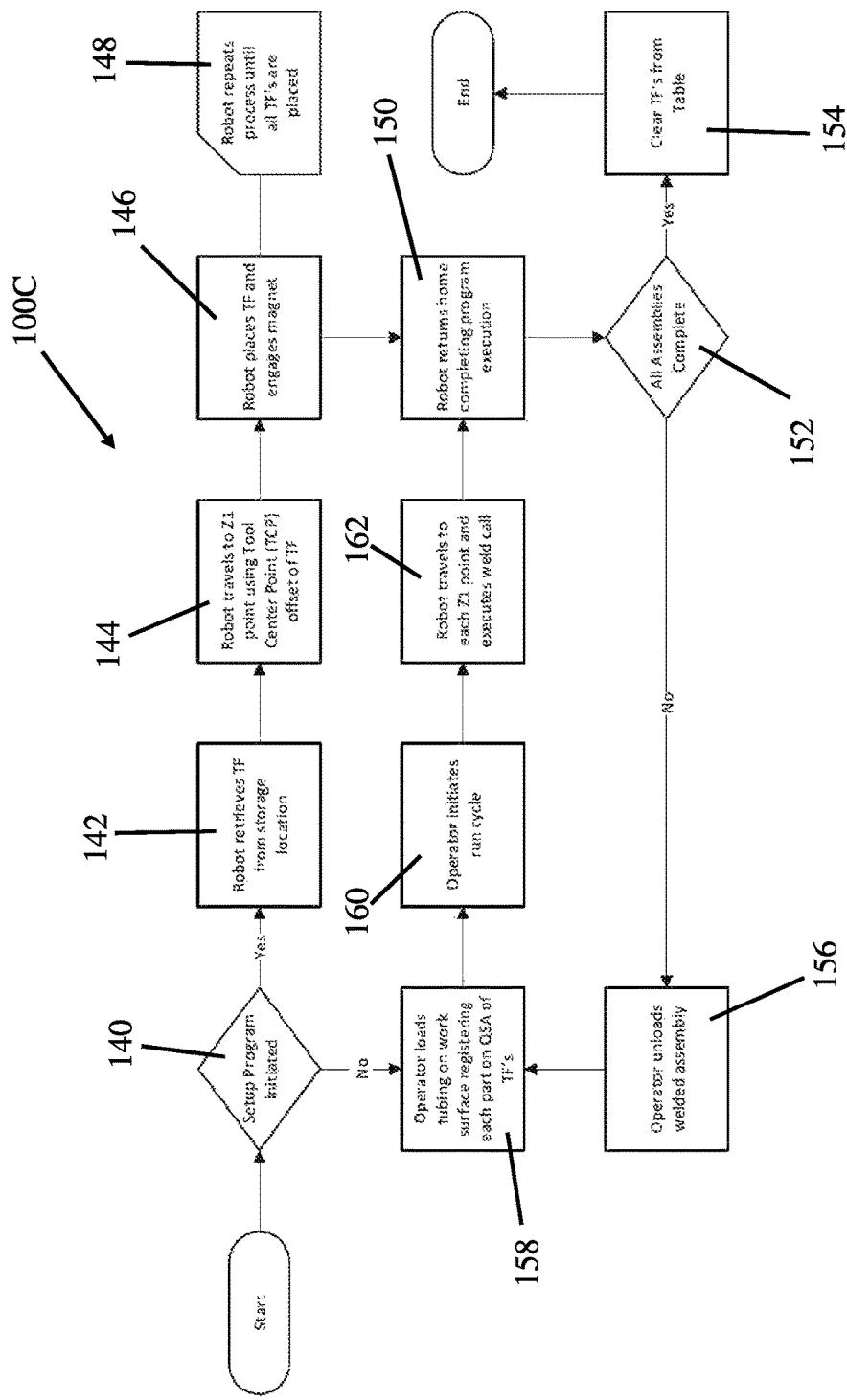
FIG. 9 is a flowchart of the work piece program execution.

Referring to FIG. 8, robotic arms may be controlled by off-line programming. Any number of suitable off-line programming software (122) may be used as the starting point for assembling the programming (100B), which is then used to control the robotic arms as described herein. Referring again to FIG. 8, CAD data is uploaded to the off-line programming software (124). The CAD data is then located (126), or a master frame is physically located (136), on the work surface. The XYZ coordinates and process locations (e.g. weld joint locations) of the assembly in the working space associated with a robotic arm are then taught to the controller on the robotic arm, either manually by the operator by moving the robotic arm across the CAD model (e.g. virtually, such as on the computer display) or across the frame or by using a touch sensing and/or vision system commonly known in the art. This process is repeated for each robotic arm (130) until all points on the assembly are taught to the controllers of the robotic arms. Then a program to execute the desired process, e.g. welds, is either created or called up (132). The process program (e.g. weld program) is then stored in the controller of the robotic arm (134) or in the computer managing all the robotic arms.

Once the registration process is complete and each of the tool fixtures is in its respective storage location, and the assembly programming is complete, then the program is ready for execution (100C). Referring to FIG. 8, the execution process 100C once initiated (140), the computer controls each robotic arm 16 to retrieve a tool fixture from its storage location (142) that suits the fixture location (e.g. for holding two components in a ninety degree configuration, it selects one of tool fixtures 12a, and for holding a single component it selects one of tool fixtures 12b) and moves the tool fixture to the fixture location in the working space (as defined by CAD program) and places it in a tool fixture location on the work surface using offset (Z1) of that tool fixture (144). Once placed, the robotic arm engages the magnet actuator (or delivers air through the pneumatic line) to move the armature to activate the magnet (146) to magnetically couple the tool fixture to the work surface. This process is repeated until all the required tool fixtures are in place and coupled to the work surface (148).

Once in place, the operator loads the components (e.g. metal tubing) in the working space on the work surface, registering each component on the respective QSA or alignment surfaces (53b, 53c, 63b) of the tool fixtures (158) and then optionally securing the components in place by moving the clamps to their clamping orientations. The operator then initiates a run cycle (160). If a work piece change for the robotic arms is needed, then robotic arms change out their gripping work piece with another work piece, such as a welding work piece, either prior to or after the run cycle is initiated. Once ready for processing, such as welding, the robotic arm executes the process program (e.g. weld program) for each process location (e.g. each weld point) (162). After the process (e.g. welding) is complete, each robotic arm is returned to its home position (150). After all process location are completed (e.g. after all welds are complete) (152), the operator unclamps the clamps and unloads the assembly (156) and, optionally, moves the magnets to their stowed positions so the tool fixtures are no longer magnetically coupled to the work surface. Optionally, the robotic arms may manipulate the magnet actuators. Thereafter, the robotic arms retrieve all the tool fixtures and return them to their respective storage locations for later use (154).

Optionally, the robotic arms may also place the components on the work surface instead of the operators, and instead retrieve the components from a staging location either on the table or an adjacent table where the components are arranged in a known order so the robotic arms know which components to retrieve, for example, using a conventional pick and place software program.

As noted above, and with reference to FIG. 6, the components forming the assemblies maybe be manually placed in the working space by one or more operators after the tool fixtures are placed in their fixture locations and coupled to the work surface. Further, as best seen in FIG. 6, multiple tables 15A, 15B may be used and supported on tracks to move the tables in and out of the joining or processing station location (such as weld station location), between the robotic arms 16.

For example, table 15A may be selected and the appropriate CAD model of the assembly that is to be assembled in table 15A may be input into the computer. Then after table 15A is moved from the pre-load station (to the left in FIG. 6) into the processing (e.g. joining, such as welding) space, such as shown in the lower portion of FIG. 6, the computer directs the robotic arms to retrieve the appropriate tool fixtures and place them on the work surface of the table 15A, and then securing them in place by activating the magnet(s), such as described above. When the tool fixture placement is completed, table 15A returns to its pre-load station where it then becomes a load station, where the components are loaded onto the table and aligned and optionally held in place by the tool fixtures.

While table 15A is in the loading station (or pre-loading station), table 15B may be selected and the CAD model of the assembly that is to be assembled in table 15B may be input into the computer. Then when table 15B is moved from its pre-loading station (to the right in FIG. 6) into the processing (e.g. joining, such as by welding) space, such as shown in the upper portion of FIG. 6, the computer directs the robotic arms to retrieve the appropriate tool fixtures and place them on the work surface of the table 15B, securing them in place by activating the magnet(s), as described above. When the tool fixture placement on table 15B is completed, table 15B returns to its pre-load station where it then becomes a loading station, where the components are loaded on to the table and secured in place by the tool fixtures.

This shuffling of the tables in and out of the processing space can significantly increase production. It also allows complimentary frames to be processed (e.g. joined such as by welding) at about the same time. It should be understood that for smaller assemblies, multiple assemblies may be fixtured on the tables so that multiple assemblies may be processed at the same time.

Figure 6A:
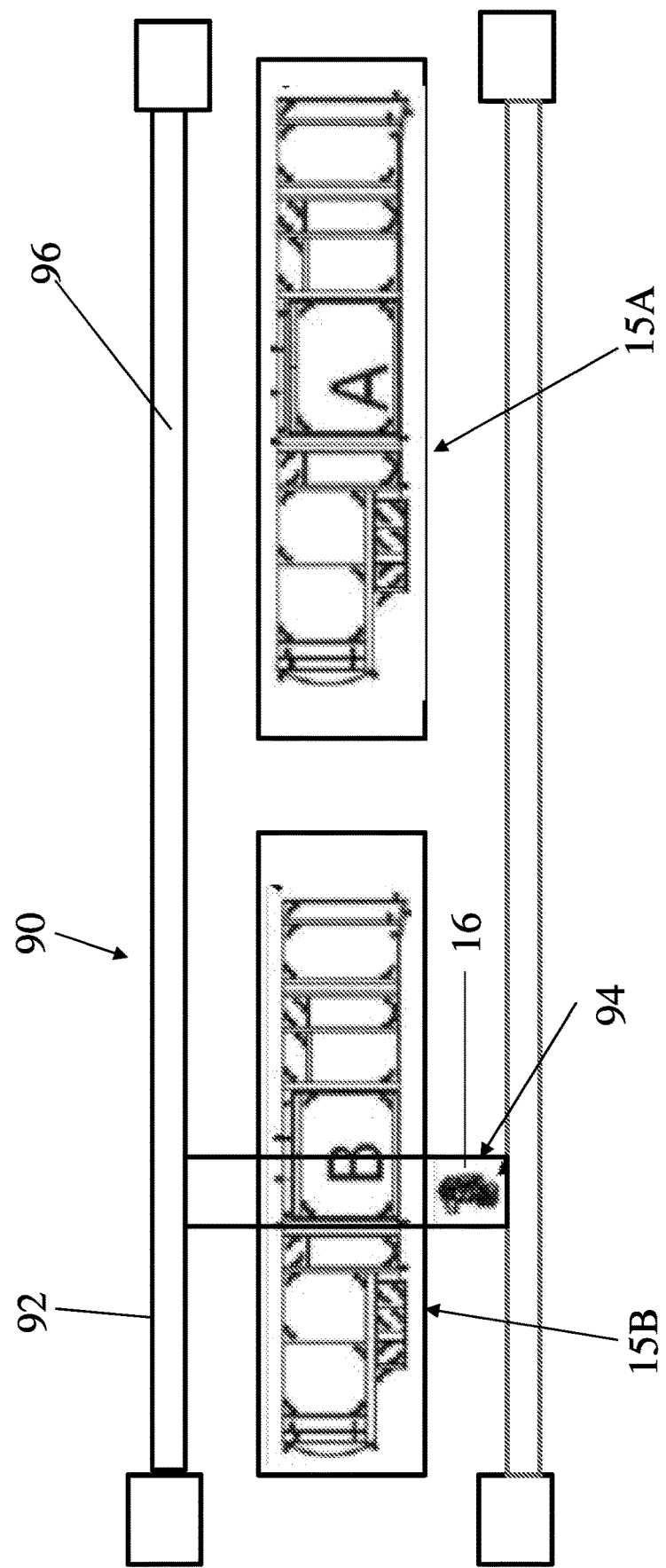
FIG. 6A is a floor plan of another embodiment of the processing system using the fixturing system.
Figure 6B:
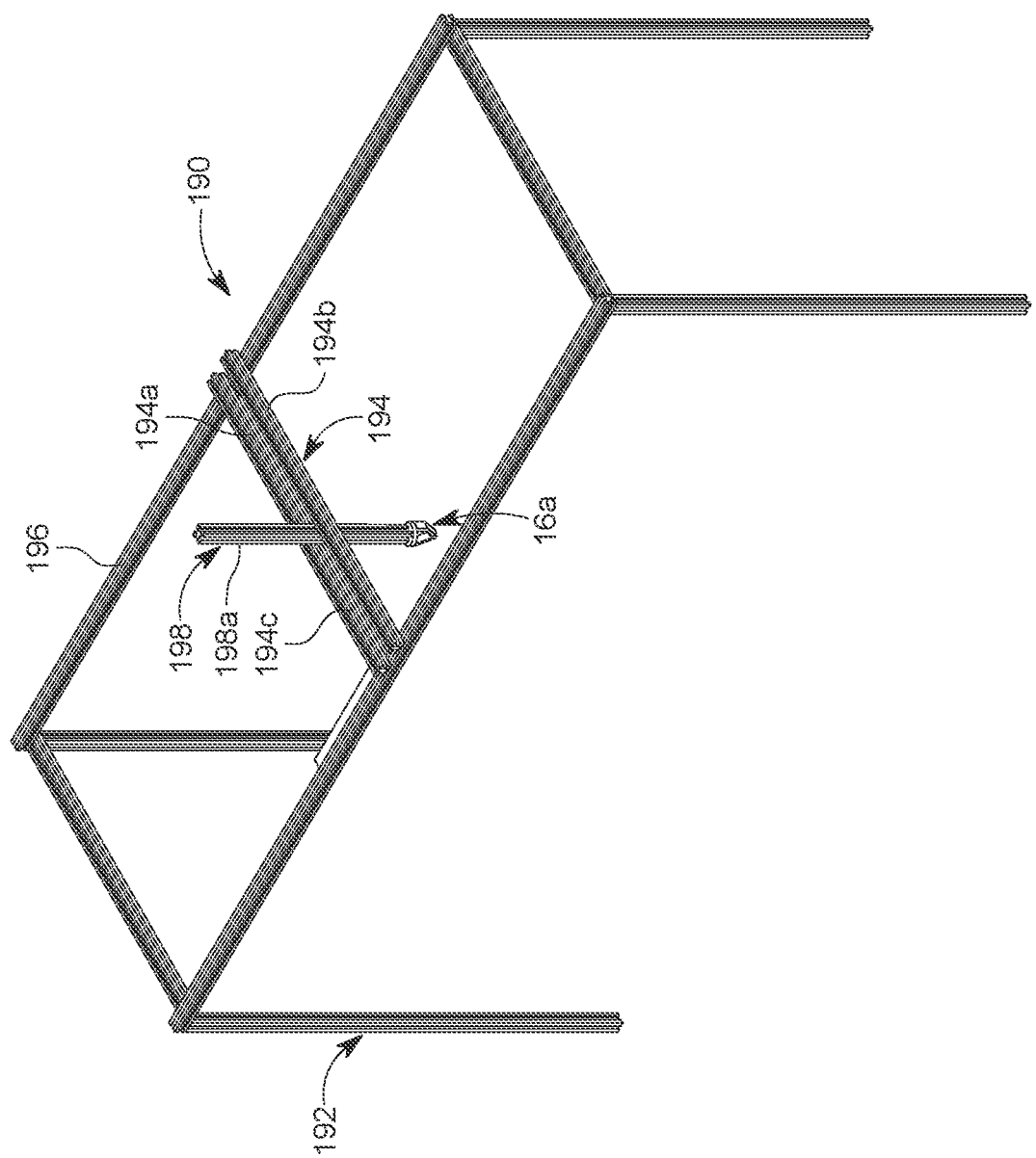
FIG. 6B is a perspective view of a X, Y, Z gantry that supports the work piece.
Figure 6C:
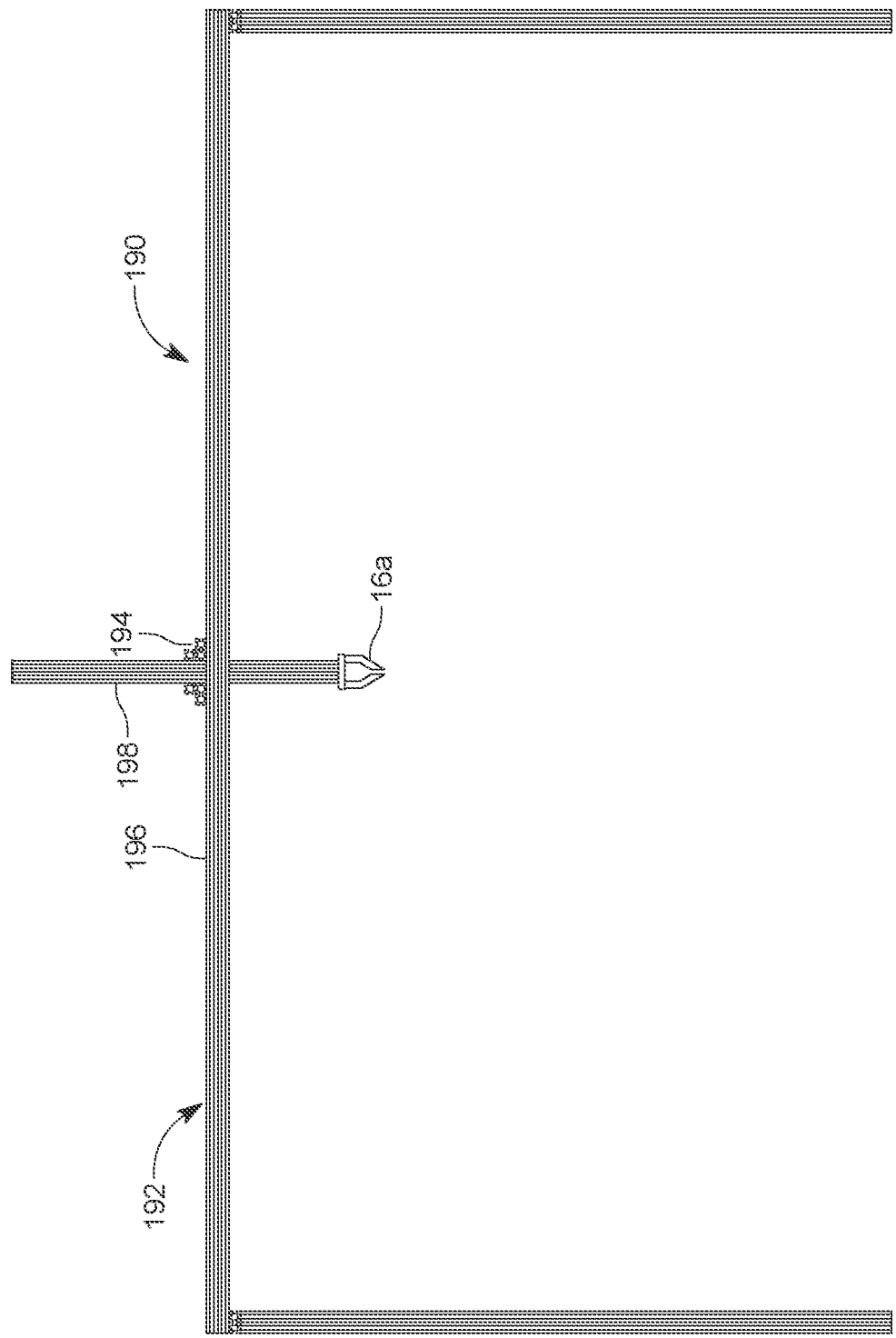
FIG. 6C is a side view of the X, Y, Z gantry.
Figure 6D:
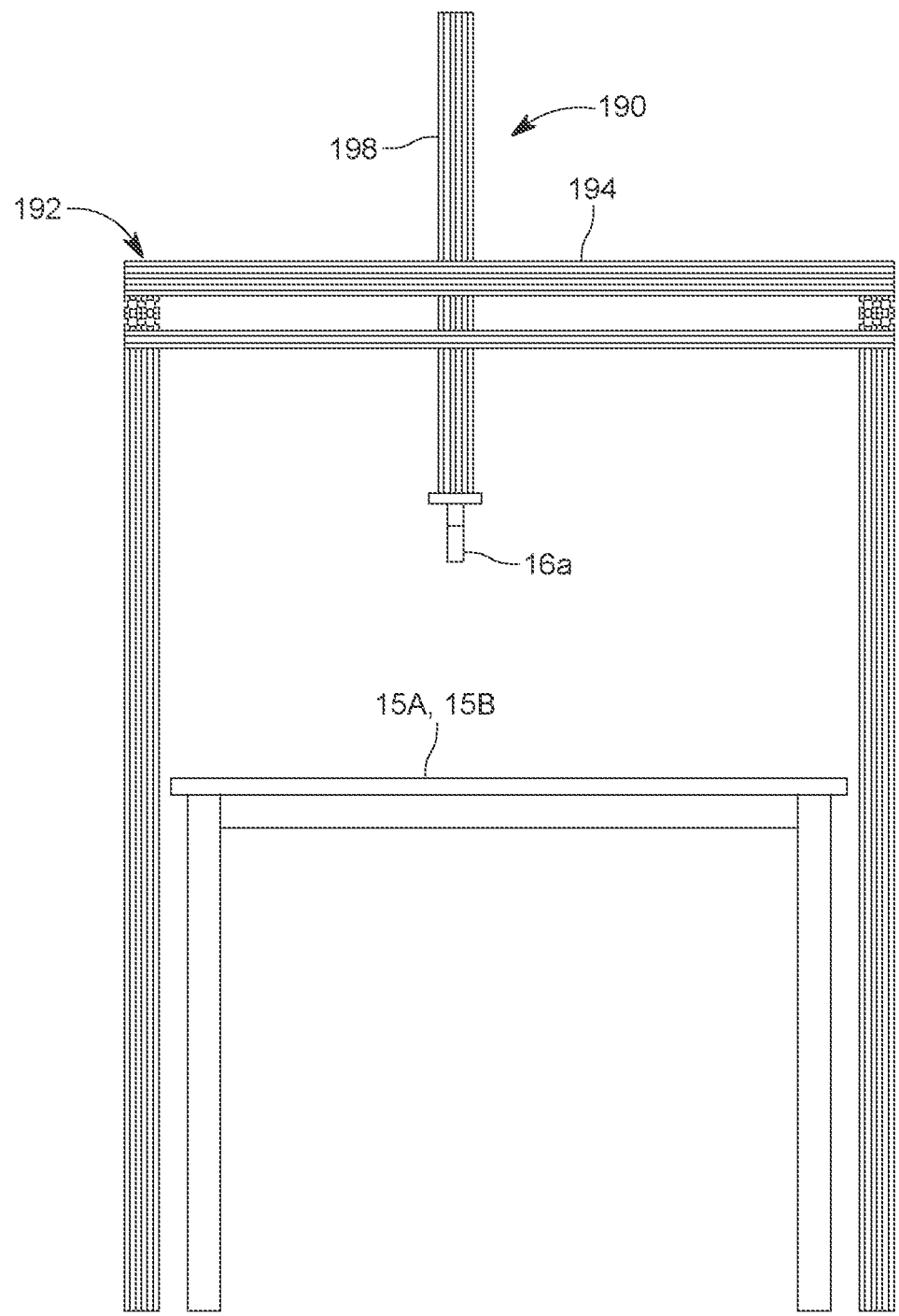
FIG. 6D is an end view of the X, Y, Z gantry.
Figure 6E:
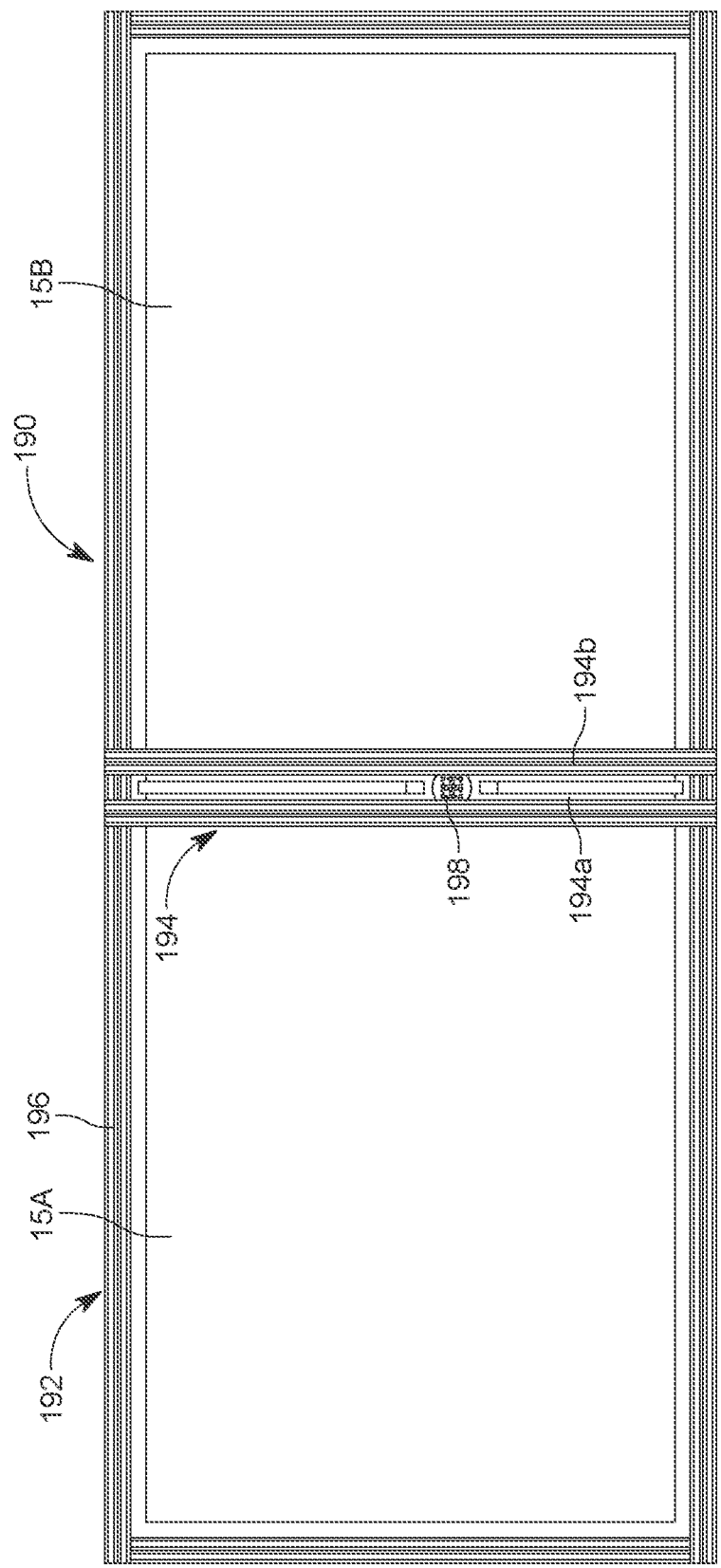
FIG. 6E is a plan of the X, Y, Z gantry.

Referring to FIG. 6A, in an alternate embodiment, the robotic arms or the work pieces may be mounted to a movable gantry 90. For example, gantry 90 may include a frame 92 that straddles tables 15A, 15B (as well as work piece storage locations 30). Gantry 90 includes one or more gantry beams 94 that are supported for linear movement along tables 15A, 15B. For example, beams 94 may be supported and movably mounted on tracks 96, which are mounted to the frame 92. Beam 94 supports one or more robotic arms 16 so that the same robotic arm or arms can process the frame components on table 15A and on table 15B. In this manner, a robotic arm may be processing one frame on table 15A while table 15B is unloaded and then reloaded with new components for forming a frame. The gantry beam is moved along the tracks by a driver, such as a gear and motor arrangement, servo motors, a cable, a chain, or a cylinder, or the like. After the components on table 15A are processed, the gantry (or gantry beam) can then be moved over table 15B. The gantry can be manually moved or also moved by a driver, such as an electric motor.

Alternately, as noted, an XYZ gantry or gantries may be used to move the work pieces across the table to place the fixtures in lieu of robotic arms and also to retrieve work pieces from their storage locations. For example, referring to FIGS. 6B-6E, the numeral 190 designates another embodiment of gantry, namely an X, Y, Z gantry, which supports and moves a work piece 16a along the x, y, and/or z axes. For example, gantry 190 may include a frame 192 that straddles one or more work surfaces, such as tables 15A, 15B, and the storage locations for the work pieces. Gantry 190 also includes one or more gantry beams 194 that are supported and movably mounted on tracks 196, which are mounted to the frame 192. Beam 194 supports one or more arms 198, which are mounted for linear movement along beam 194 and also for vertical movement relative to beam 194, which supports a work piece 16a, for example, at its distal end. In this manner, beam 194 and arm 198 may move work piece 16a along the x, y, and/or z axes.

Beam 194 may be formed by a pair of beam members 194a and 194b, with arm 198 supported there between and moved along beam 194 by a driver 194c and moved vertically with respect to beam, 194 by another driver 198a. Suitable drivers include gears, motors, including servo motors, cables, chain, or a cylinder, or the like.

Again, similar to gantry 90, gantry 190 may move work piece across one table 15A, while table 15B is unloaded and then reloaded with new components for forming a frame. After the components on table 15A are processed, the gantry (or gantry beam) can then be moved over table 15B. The gantry 190 can be manually moved or also moved by a driver, such as an electric motor.

Accordingly, as would be understood from the above description, once a tool fixture has been introduced into the system, the tool fixture is managed by the robotic arm or work piece and does not have to be relearned by the robotic arm or work piece (e.g. the controller and/or computer) until it is damaged and requires repair or replacement. Further as noted above, the fixture may have a vertical dimension so that the working space has X, Y, and Z components. Additionally, although illustrated as being horizontal the work surface may be vertical.

Various additional alterations and changes beyond those already mentioned herein can be made to the above-described embodiments. For example, the robotic arms and/or work pieces may also include sensors to determine the offset from the reference fixture in lieu of or in addition to the calculations done by the computer. In some embodiments, as noted, the tool fixtures may not need clamps and, instead, could simply provide alignment or other types of holding devices or surfaces on the base to hold and/or align the components.

Further, as noted above, various couplers may be used, including on the fixture and/or the work surface, which allow for infinite positioning at least in the X and Z plane defined by the work surface.

This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

We claim:

1. A fixturing system for processing a component, the fixturing system comprising:
   a work surface having an X-Z plane;
   a tool fixture;
   a releasable coupler operable for securing said tool fixture to said work surface in an infinite number of positions at least in said X-Z plane of said work surface and having at least one alignment surface to align the component relative to said tool fixture and on said work surface;
   a storage location spaced from said work surface for storing said tool fixture when not in use on said work surface;
   a work piece for holding said tool fixture; and
   a computer having stored therein component location data, and said computer configured to be operable to move and control said work piece to thereby to retrieve said tool fixture from said storage location and to place said tool fixture on said work surface at a tool fixture location based on said component location data for aligning the component with said tool fixture while being processed.

2. The fixturing system according to claim 1, wherein said component location data includes a process location, and said computer being configured to control said work piece to place said tool fixture on said work surface at said tool fixture location at an offset from said process location.

3. The fixturing system according to claim 2, wherein said computer is configured to determine said offset for said tool fixture.

4. The fixturing system according to claim 3, wherein said computer has stored therein a defined working space on said work surface, said fixturing system further comprising a reference fixture for placement in a known location in said defined working space on said work surface, said tool fixture having a tool fixture identification, and said computer configured to use said reference fixture to determine said offset from said process location for said tool fixture and to associate and store said offset with said tool fixture identification for said tool fixture.

5. The fixturing system according to claim 3, wherein said tool fixture has a tool fixture body, said computer configured to control said work piece to engage said tool fixture body at a known location on said tool fixture body, and when said tool fixture is registered with said reference fixture, said computer determining said offset based on said known location and registration with said reference fixture.

6. The fixturing system according to claim 1, wherein said tool fixture comprises at least one hold down device to hold at least one component relative to said tool fixture and to said work surface.

7. The fixturing system according to claim 6, wherein said at least one hold down device comprises a pair of clamps at an angle relative to each other to hold two components at an angle relative to each other while being processed.

8. The fixturing system according to claim 1, wherein said tool fixture is configured to frictionally hold the component relative to said tool fixture and to said work surface.

9. The fixturing system according to claim 8, wherein said tool fixture includes an arm to provide at least an interference fit between the component and said work surface to frictionally hold the component relative to said tool fixture and to said work surface.

10. The fixturing system according to claim 9, wherein said arm is configured to form a spring to spring bias the component relative to said tool fixture and to said work surface to thereby frictionally hold the component relative to said tool fixture and to said work surface.

11. The fixturing system according to claim 1, wherein said work surface is formed from a ferromagnetic material, and said coupler includes a magnet mounted to said fixture for magnetically coupling said fixture to said work surface.

12. The fixturing system according to claim 1, further comprising a gantry and/or a robot arm supporting said work piece.

13. A fixturing system for holding components to be assembled to form an assembly, said system comprising:
    a work surface formed from a ferromagnetic material;
    a plurality of tool fixtures, each respective tool fixture of said plurality of tool fixtures having a magnet when activated being operable for coupling said respective tool fixture to said work surface and when deactivated being decoupled from said work surface, and at least one respective tool fixture of said plurality of tool fixtures having at least one hold down device to hold a component relative to said respective tool fixture and said work surface;
    a storage location for each respective tool fixture, said storage locations spaced from said work surface for storing said respective tool fixtures when not in use on said work surface;
    a work piece; and
    a computer having stored therein joint location data of each joint of the assembly, and said computer configured to control said work piece to retrieve said respective tool fixtures from said storage locations and to place said respective tool fixtures on said work surface at tool fixture locations based on said joint location data to hold the components while being assembled.

14. The fixturing system according to claim 13, wherein said computer has stored therein a defined working space on said work surface, said fixturing system further comprising a reference fixture for placement in a known location in said defined working space on said work surface, said respective tool fixtures each having a tool fixture identification, and said computer configured to use said reference fixture to determine an offset from a fixture joint location of each of said respective tool fixtures and to associate said offsets with said tool fixture identification for each of said respective tool fixtures, and said computer controlling said work piece to place said respective tool fixtures at said tool fixture locations based on said offsets and said joint location data.

15. The fixturing system according to claim 14, wherein said computer stores said offsets in association with said tool fixture identification for each of said respective tool fixtures, and said computer optionally configured to periodically check said offsets of each respective tool fixture against said reference fixture to determine wear or damage to said respective tool fixture.

16. The fixturing system according to claim 13, wherein said computer is configured to control said work piece to activate or deactivate said magnets of said respective tool fixtures.

17. The fixturing system according to claim 13, wherein said computer is configured to control said work piece to retrieve said tool fixtures from said work surface after the components are joined and said magnets are deactivated.

18. The fixturing system according to claim 17, wherein said computer is configured to control said work piece to activate or deactivate said magnets of said tool fixtures.

19. The fixturing system according to claim 17, wherein said computer is configured to control said work piece to return said tool fixtures to their respective storage locations after the components are joined.

20. The fixturing system according to claim 17, wherein said work piece is configured to place the components in said working space relative to said tool fixtures.

* * * * *